United States Patent
Foerster et al.

(10) Patent No.: US 10,419,820 B2
(45) Date of Patent: Sep. 17, 2019

(54) PROFILING MEDIA CHARACTERS

(71) Applicant: CharacTour LLC, Chicago, IL (US)

(72) Inventors: Kimberly Foerster, Chicago, IL (US); Pete McEntegart, Chicago, IL (US)

(73) Assignee: CharacTour LLC, Chicago, IL (US)

( * ) Notice: Subject to any disclaimer, the term of this patent is extended or adjusted under 35 U.S.C. 154(b) by 710 days.

(21) Appl. No.: 14/830,066

(22) Filed: Aug. 19, 2015

(65) Prior Publication Data

US 2016/0057499 A1 Feb. 25, 2016

Related U.S. Application Data

(60) Provisional application No. 62/039,134, filed on Aug. 19, 2014.

(51) Int. Cl.

| | |
|---|---|
| *H04N 21/475* | (2011.01) |
| *G06Q 50/00* | (2012.01) |
| *H04N 21/25* | (2011.01) |
| *H04N 21/258* | (2011.01) |
| *H04N 21/4782* | (2011.01) |
| *H04N 21/482* | (2011.01) |

(52) U.S. Cl.
CPC ......... *H04N 21/4758* (2013.01); *G06Q 50/01* (2013.01); *H04N 21/251* (2013.01); *H04N 21/25891* (2013.01); *H04N 21/4755* (2013.01); *H04N 21/4756* (2013.01); *H04N 21/4782* (2013.01); *H04N 21/4828* (2013.01)

(58) Field of Classification Search
CPC .. H04N 21/4758; H04N 21/25; H04N 21/258; G06Q 50/00
See application file for complete search history.

(56) References Cited

U.S. PATENT DOCUMENTS

| | | | |
|---|---|---|---|
| 7,613,706 B2* | 11/2009 | Terrill | ............... G06F 17/30572 |
| 9,785,954 B2* | 10/2017 | Wu | ........................ G06Q 30/02 |
| 2004/0199923 A1 | 10/2004 | Russek | |
| 2004/0267816 A1 | 12/2004 | Russek | |

(Continued)

OTHER PUBLICATIONS

Zuras, Matthew "Does This Facebook Analysis Tool Really Know You?" Reginery29. <http://www.refinery29.com/2014/06/69433/five-labs-facebook-analysis>. Jun. 11, 2014. (Year: 2014).*

(Continued)

*Primary Examiner* — Amanda C Abrahamson
(74) *Attorney, Agent, or Firm* — Pillsbury Winthrop Shaw Pittman LLP

(57) ABSTRACT

Provided is a process of matching media characters, the process including: obtaining a plurality of character records, each character record including a trait vector specifying traits of the respective character; receiving a request from a user device to match characters in the character records, the request identifying at least one reference character record; calculating, with one or more processors, matching scores indicative of similarity between the trait vector of the reference character record and trait vectors of other character records among the plurality of character records; selecting a responsive character record from among the plurality of character records based on the matching scores; and sending instructions to the user device to display information about a character of the responsive character record.

19 Claims, 23 Drawing Sheets

(56) References Cited

U.S. PATENT DOCUMENTS

| | | |
|---|---|---|
| 2009/0248399 A1 | 10/2009 | Au |
| 2011/0154400 A1* | 6/2011 | Johnson .............. G06Q 30/02 725/46 |
| 2012/0210203 A1 | 8/2012 | Kandekar et al. |
| 2014/0038154 A1 | 2/2014 | Brownlow et al. |
| 2014/0162225 A1 | 6/2014 | Hill |
| 2014/0350921 A1 | 11/2014 | Killalea et al. |
| 2014/0359439 A1 | 12/2014 | Lyren |
| 2015/0046346 A1 | 2/2015 | Juola et al. |
| 2015/0058347 A1 | 2/2015 | Russek |
| 2015/0066968 A1 | 3/2015 | Bastide et al. |
| 2015/0154177 A1 | 6/2015 | Allen et al. |
| 2015/0212994 A1 | 7/2015 | Bohra |
| 2015/0227973 A1 | 8/2015 | Wirtz et al. |

OTHER PUBLICATIONS

Match.com, L.L.C.; Patent Issued for Matching Process System and MethodJournal of Engineering [Atlanta] Nov. 6, 2013: 6427. (Year: 2013).*

'Five Labs Facebook Personality App', http://www.businessinsider.com/fivelabsfacebookpersonalityapp20146, Business Insider, Jun. 10, 2014, pp. 1 to 7.

* cited by examiner

| Example: Calculating % Match | | | | | |
|---|---|---|---|---|---|
| Personality Trait | Character 1 | Character 2/User | % Match to Character 1 | Weighting Factor Based on Character 1* | % Match with Weighting Factor |
| Chatty/Talkative (1) vs. Reserved/Quiet (5) | 1.5 | 2.0 | 87.5 | 3 | 262.5 |
| Cocky/Arrogant (1) vs. Humble (5) | 1.0 | 1.0 | 100.0 | 3 | 300.0 |
| Social (1) vs. Loner (5) | 1.0 | 2.0 | 75.0 | 3 | 225.0 |
| Selfless (1) vs. Very Selfish (5) | 4.0 | 4.5 | 87.5 | 1 | 87.5 |
| Polite (1) vs. Rude/Crude (5) | 3.0 | 4.0 | 75.0 | 1 | 75.0 |
| Optimistic/Trusting (1) vs. Cynical/Untrusting | 1.5 | 5.0 | 12.5 | 3 | 37.5 |
| Organized (1) vs. Disorganized (5) | 3.0 | 3.0 | 100.0 | 1 | 100.0 |
| Determined/Focused (1) vs. Unfocused (5) | 2.5 | 1.0 | 62.5 | 1 | 62.5 |
| Sensitive/Vulnerable (1) vs. Thick-Skinned (5) | 3.5 | 4.5 | 75.0 | 1 | 75.0 |
| Depressed (1) vs. Happy (5) | 5.0 | 1.5 | 12.5 | 3 | 37.5 |
| Hotheaded (1) vs. Easy Going (5) | 4.0 | 1.5 | 37.5 | 1 | 37.5 |
| Uptight (1) vs. Free-spirited/Playful (5) | 4.5 | 4.5 | 100.0 | 1 | 100.0 |
| Neurotic/Unstable (1) vs. Emotionally Stable | 4.0 | 4.0 | 100.0 | 1 | 100.0 |
| Very Traditional (1) vs. Quirky (5) | 3.5 | 5.0 | 62.5 | 1 | 62.5 |
| Risk-taking/Fearless (1) vs. Risk-averse/Timid | 2.0 | 1.0 | 75.0 | 1 | 75.0 |
| Genius/Wise (1) vs. Dim-Witted (5) | 2.5 | 1.5 | 75.0 | 1 | 75.0 |
| Highbrow (1) vs. Lowbrow (5) | 2.5 | 1.5 | 75.0 | 1 | 75.0 |
| Mature/Responsible (1) vs. Immature (5) | 4.0 | 3.0 | 75.0 | 1 | 75.0 |
| Often Funny (1) vs. Never Funny (5) | 2.0 | 1.5 | 87.5 | 1 | 87.5 |
| Sexy (1) vs. Unsexy/Awkward (5) | 2.5 | 1.5 | 75.0 | 1 | 75.0 |
| Drinker/Drug user/Gambler (1) vs. Wholes | 2.5 | 1.0 | 62.5 | 1 | 62.5 |
| Lustful/Promiscuous (1) vs. Virginal (5) | 2.5 | 2.0 | 87.5 | 1 | 87.5 |
| Smooth/Poised (1) vs. Bumbling (5) | 2.5 | 2.0 | 87.5 | 1 | 87.5 |
| Manipulative (1) vs. Submissive (5) | 2.0 | 1.5 | 87.5 | 1 | 87.5 |
| Dishonest (1) vs. Honest (5) | 2.5 | 4.0 | 62.5 | 1 | 62.5 |
| Homicidal (1) vs. Not Homicidal (4) | 4.0 | 1.0 | 25.0 | 1 | 25.0 |
| Total | | | | 36 | 2437.5 |
| % Match (Total % Match with Weighting Factors Divided by Total Weighting Factors) | | | | | 67.7 |

* Weighting factor applied when a character has a 1.0, 1.5, 4.5, or 5.0 -- i.e., a "dominant" trait.

FIG. 2

Breaking Bad
Walter White

| | | Rating | Comments |
|---|---|---|---|
| 1 | Chatty/Talkative (1) vs. Reserved/Quiet (5) | 3.0 | |
| 2 | Cocky/Arrogant (1) vs. Humble (5) | 1.0 | Knows he is the best chemist, meth cook |
| 3 | Social Butterfly (1) vs. Loner (5) | 4.5 | Usually keeps to himself |
| 4 | Selfless (1) vs. Selfish (5) | 4.0 | Loyal to himself, tries to convince himself he's loyal to his family |
| 5 | Polite (1) vs. Rude/Crude (5) | 2.0 | Grows less polite as time passes; Walt is a 1, Heisenberg is a 4 |
| 6 | Optimistic/Trusting (1) vs. Cynical/Untrusting (5) | 4.0 | Trusts only himself |
| 7 | Organized (1) vs. Disorganized (5) | 1.5 | Meticulous as a chemist |
| 8 | Determined/Focused (1) vs. Unfocused (5) | 1.5 | Single minded pursuit of success |
| 9 | Tender/Sensitive (1) vs. Thick-Skinned (5) | 4.0 | Unfazed by attacks, physical or emotional |
| 10 | Depressed (1) vs. Happy (5) | 2.0 | |
| 11 | Hotheaded (1) vs. Easy Going (5) | 2.0 | Quiet anger is very common |
| 12 | Uptight (1) vs. Free-spirited/Playful (5) | 1.5 | Not ever playful, wants to do everything by the book |
| 13 | Neurotic/Unstable (1) vs. Emotionally Stable (5) | 4.0 | |
| 14 | Very Conventional (1) vs. Very Quirky (5) | 2.0 | |
| 15 | Risk-taking/Fearless (1) vs. Risk-averse/Timid (5) | 1.5 | Puts himself way out in his adventures |
| 16 | Genius/Wise (1) vs. Dim-Witted (5) | 1.0 | Widely considered a genius |
| 17 | Highbrow (1) vs. Lowbrow (5) | 1.5 | Appreciates science and literature |
| 18 | Mature/Responsible (1) vs. Immature (5) | 2.5 | |
| 19 | Often Funny (1) vs. Never Funny (5) | 4.5 | Very seldom jokes |
| 20 | Sexy (1) vs. Unsexy/Awkward (5) | 3.0 | |
| 21 | Drinker/Drug user/Gambler (1) vs. Wholesome (5) | 2.0 | Not wholesome; gambling is the nicer alternative to his real crimes |
| 22 | Lustful/Promiscuous (1) vs. Virginal (5) | 2.5 | Tries to get with his boss, lustful in the beginning |
| 23 | Smooth/Poised (1) vs. Bumbling (5) | 2.5 | |
| 24 | Manipulative (1) vs. Submissive (5) | 1.0 | Always manipulating everyone |
| 25 | Dishonest (1) vs. Honest (5) | 1.5 | Constantly lying |
| 26 | Homicidal (1) vs. Not Homicidal (4) | 2.0 | Kills often, but not for fun, only for personal gain |

FIG. 22

PROFILING MEDIA CHARACTERS

CROSS-REFERENCE TO RELATED APPLICATIONS

The present application claims the benefit of U.S. Provisional Patent Application 62/039,134, filed 19 Aug. 2014, titled Profiling Media Characters, the entire contents of which are hereby incorporated by reference.

BACKGROUND

1. Field

The present invention relates generally to profiles and, more specifically, to media character profiles and related on-line communities.

2. Description of the Related Art

Recommendation systems are a type of information filtering system used to predict the degree to which a user is likely to appreciate various forms of media, such as fictional books, movies, video games, plays, and the like. Often recommendation systems contain a media repository (e.g., information about the media, and in some cases, the media itself) and user-selectable filters that allow users to specify criteria and identify responsive media meeting their criteria. These systems, however, generally filter and organize data with the media items as the fundamental unit of data, e.g., supporting searches for books or movies having certain attributes. Users, however, often have more fine-grained preferences—especially related to the individual characters contained in that media (referred to as media characters)— that are not readily expressed in terms of the overall media item's attributes. As a result, users often fail to identify media that they would enjoy and consume media that fails to entertain them.

SUMMARY

The following is a non-exhaustive listing of some aspects of the present techniques. These and other aspects are described in the following disclosure.

Some aspects include a process of matching characters, the process including: obtaining a plurality of character records, each character record including a trait vector specifying traits of the respective character; receiving a request from a user device to match characters in the character records, the request identifying at least one reference character record; calculating, with one or more processors, matching scores indicative of similarity between the trait vector of the reference character record and trait vectors of other character records among the plurality of character records; selecting a responsive character record from among the plurality of character records based on the matching scores; and sending instructions to the user device to display information about a character of the responsive character record.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements:

FIG. 2 shows an example of a matching determination;

FIG. 22 shows an example of a calibration document.

Figure 1A:
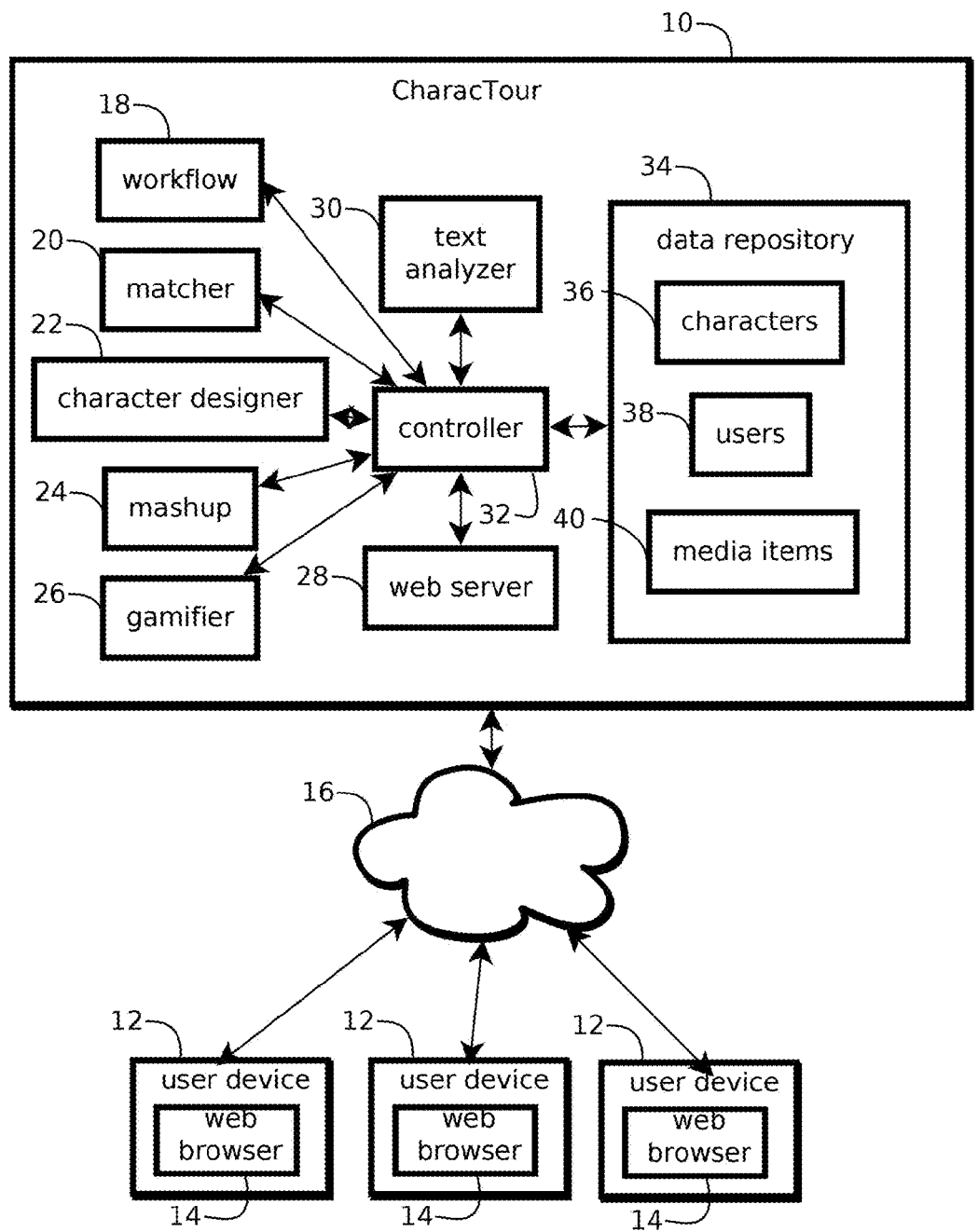
FIG. 1A shows an example of the CharacTour system and the environment in which it operates.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of recommending media and building on-line communities. Indeed, the inventors wish to emphasize the difficulty of recognizing those problems that are nascent and will become much more apparent in the future should trends in the content discovery industry continue as applicants expect. Further, because multiple problems are addressed, it should be understood that some embodiments are problem-specific, and not all embodiments address every problem with traditional systems described herein or provide every benefit described herein. That said, improvements that solve various permutations of these problems are described below.

Some of the above-mentioned issues with traditional recommendation systems are mitigated by a recommendation system 10 shown in FIG. 1 and referred to as the CharacTour system, or CharacTour. In some embodiments, CharacTour organizes the universe of movies/TV/books (plus video games, web comics, etc.) around the characters themselves appearing in the respective instances of media. In some implementations, each character has its own profile web page (based on data stored in memory in CharacTour and presented based on instructions for a client device composed by CharacTour), as if the character was a "real person." CharacTour 10 may host a website with a variety of web pages each providing a different way for users to discover and be funneled to these profile pages of each character. Examples are described below with reference to FIGS. 3-21, which are screen shots of an embodiment of CharacTour.

CharacTour 10 supports, in the illustrated embodiment, a web-based client-server architecture in which a web server receives requests for content from user devices 12 executing client-side web browsers 14, selects responsive content (e.g., character profile web pages or character-search web pages for the user to specify criteria by which characters are to selected), and sends the responsive content to the respective user device 12 over the Internet 16 for rendering and presentation to the user. Embodiments, however, are not limited to web-based implementations. In some embodiments, a special purpose native application executing on a client device (e.g., a smart phone, tablet computer, set-top box, gaming console, in-store kiosk, or the like) may exchange corresponding data with the server via an application program interface, e.g., supporting requests for profiles, requests for interfaces to specify search criteria, and sending profiles and instructions to present corresponding interfaces.

In some embodiments, CharacTour 10 includes a workflow module 18, a matcher 20, a character designer 22, a mashup module 24, a gamifier 26, a text analyzer 30, a controller 32, a web server 28, and a data repository 34. Repository 34 may include a characters data repository 36, a users data repository 38, and a media items data repository 40. In some cases, the web server 28 may receive web requests and data from the user devices 12, and the controller 32 may communicate with the other components of charactour 10 to coordinate responsive actions.

In some embodiments, CharacTour 10 provides a service of matching characters to other characters, and characters to users, based on relatively detailed personality analysis of both the characters and the users. In some cases, these features are implemented in matcher 20. Some embodiments store in memory character and user records (e.g., in repositories 36 and 38, respectively) each containing an assessment of personality (for both the characters and the users) in numerical terms, e.g., with each of the 26 individual traits (e.g., attributes of the user or the character) identified. In some cases, each such trait is represented by a value on a continuum with a spectrum running from 1-5, with the "1" and "5" representing opposite extremes, or "poles," of a particular trait. The use of such traits finds support in academic literature, e.g., the "Big Five Personality Traits," a well-accepted theory among academics of evaluating personality.

In one example, the first trait is "Talkative<==>Quiet," with incredibly chatty characters being scored as a "1," super-quiet characters a "5," someone who talks approximately as much as the average person getting a "3," a just slightly more verbose character receiving a 3.5, etc. Thus, in some embodiments, each trait for a character has a potential numerical score from 1-5 by increments of 0.5 (i.e. 1, 1.5, 2, 2.5, etc., up to 5). Embodiments, of course, are not limited to ranges from 1 to 5, increments of 0.5, or to 26 traits. Some embodiments may include larger ranges or more than 26 dimensions for finer-grained measurements (at the expense of complexity, both in terms of storage complexity and computational time complexity) or fewer/smaller versions of these features. An example list of traits described as opposing characteristics on a continuum is presented below:

1. Chatty/Talkative (1) to Reserved/Quiet (5)
2. Cocky/Arrogant (1) to Humble (5)
3. Social Butterfly (1) to Loner (5)
4. Selfless (1) to Selfish (5)
5. Polite (1) to Rude/Crude (5)
6. Optimistic/Trusting (1) to Cynical/Untrusting (5)
7. Organized (1) to Disorganized (5)
8. Determined/Focused (1) to Unfocused (5)
9. Sensitive/Vulnerable (1) to Thick-Skinned (5)
10. Depressed (1) to Happy (5)
11. Hot Headed (1) to Easy Going (5)
12. Uptight (1) to Free-spirited/Playful (5)
13. Neurotic/Unstable (1) to Emotionally Stable (5)
14. Very Conventional (1) to Very Quirky (5)
15. Risk-taking/Fearless (1) to Risk-averse/Timid (5)
16. Genius/Wise (1) to Dim-Witted (5)
17. Highbrow (1) to Lowbrow (5)
18. Mature/Responsible (1) to Immature (5)
19. Often Funny (1) to Never Funny (5)
20. Sexy (1) to Unsexy/Awkward (5)
21. Drinker/Drug user/Gambler (1) to Wholesome (5)
22. Lustful/Promiscuous (1) to Virginal (5)
23. Smooth/Poised (1) to Bumbling (5)
24. Manipulative (1) to Submissive (5)
25. Dishonest (1) to Honest (5)
26. Homicidal (1) to Not Homicidal (4)

Similarly, to obtain traits (also referred to as attributes) of users, CharacTour 10 may send the user device 12 (also referred to as a client device) instructions to present (e.g., in a web form) a personality quiz that is capable of receiving user responses and sending those responses to CharacTour 10 for creation or modification of a user record storing the results. When a user takes the personality quiz, embodiments may plot them numerically on the same list of traits via their answers in a display sent to the client device 12. In some cases, a user interface for the quiz may include a "slider" mechanism so that users can lock in answers from 1.0-5.0, by each 0.1, on each question/trait.

Therefore, in some implementations, a user who takes a personality quiz may provide data by which the system 10 can generate a specific and distinct numerical match percentage to characters on the site, e.g., by matcher 20. A user who registers with CharacTour 10 may, in some embodiments, "save" their quiz answers, so that the user's personality match percentage to the characters will be displayed throughout the user's experience on the site. For example, on each profile page, CharacTour 10 may display the specific percent Personality Match of that character to the registered user right at the top of the character's profile page. Users may also see their percent Personality Match to others users who allow that data to be shown, and users may be able to sort users' comments by how "similar" those other users are to them, according to the results of the personality quiz.

After a registered user takes the personality quiz, moreover, CharacTour 10 may track that user on the site and factor that behavior into later recommendations. For instance, embodiments may monitor what characters a user rates highly, or what characters' movies/TV shows/books the user downloads or buys, or what character pages a user spends the most time on or comments most frequently about. All of that data may be corresponded to the results of that user's personality quiz, in some embodiments.

Therefore, when future CharacTour users take the personality quiz, some embodiments will not only be able to match them with characters that are most similar to them on the 26 personality traits, some embodiments will also have the ability to recommend characters that others users who are similar to them—according to the results of the personality quiz—have in fact demonstrated that they tend to like, judging by the actions described in the previous paragraph that have been observed. Thus the data collected on users' behavior on the site may be automatically fed into the algorithm matching users to characters in some embodiments.

Some embodiments of matcher 20 may execute a matching algorithm that gives added weight to commonalities on the extremes of individual traits. Thus, it may mean more mathematically if two characters, or a user and a character, are both a 1.5 on a particular trait than if they are both a 3, because the latter really means that individual trait is not that important to defining them, because they are in the middle of the scale for that particular trait. The weighting of extremes may be performed with a variety of techniques, including by transforming the scales from 1 to 5 non-linearly to a larger range, e.g., 1 to 20, by multiplying the trait score with a value that depends on the trait score and changes more rapidly (as a function of the trait score) for trait scores near the extremes than for trait scores near the middle. In another example, a lookup table stored in memory may map trait scores from one regime to the other, for instance, mapping a score of 1 to a weighted score of 1, a score of 1.5 to a weighted score of 5, a score of 2 to a weighted score of 8, a score of 2.5 to a weighted score of 10, and so on.

In some cases, to facilitate various forms of matching (e.g., ranking or one-to-one matches) each character record may include a unique identifier of the character, and a trait vector specifying the trait scores (or weighted trait scores, emphasizing those scores on the extremes) and defining a 26-dimensional character-attribute vector space that users may explore by specifying search criteria. The trait vectors may be encoded as ordered lists to reduce memory consumption or as a collection of 26 fields each having a scalar value, e.g., as traits of a character object in an object oriented programming environment. User records stored in memory may be similarly associated with user-trait vectors specifying a user's preference on a scale of 1 to 5 among the 26 dimensions (again, in some cases, with weighted trait scores, emphasizing those scores on the extremes).

Trait vectors may be compared (e.g., matched) based on a variety of techniques. For example, as shown in FIG. 2, a numerical value may be calculated by some embodiments of CharacTour 10 based on how closely each trait corresponds. For instance, if both characters score a 3.0 on a trait, they may have a 100% match on that trait. In another example, assuming that Character #1 scores a 2.0 on a particular trait, if the Character #2 scores a 2.5 on that same trait, the match is 87.5% (or 12.5% less than 100%); if Character #2 is a 3.0, the match is 75% (or 25% less than 100%); if Character #3 is a 3.5, the match is 62.5% (or 37.5% less than 100%), and so on, in this example.

In some embodiments, each difference of 0.5 on an individual trait may correspond to a percentage difference of 12.5%, from 1.0% up to 100.0%. In some embodiments, the highest absolute difference between two characters on an individual trait may be 4.0, i.e., the difference between a 1.0 (the lowest possible value) and a 5.0 (the highest possible value), in this example scoring scheme. That maximum difference in this example equates to a 1.0% match in some implementations. An absolute difference of 3.5—such as between a 1 and a 4.5—would be a 12.5% match; a difference of 3.0 would be a 25% match; a difference of 2.5 would be a 37.5% match, etc. Or other scoring and calculations, such as those described below, may be used.

Once a numerical match is established for each individual trait, some embodiments of CharacTour 10 may average the numerical match values across all the traits (e.g., all of at least some of, or all of the traits) to reach an overall percentage match between the two characters—with one caveat in some use cases. Since some traits may be more important to a particular character's personality, the matching algorithm of some embodiments may give added weight to these key or "dominant" traits, meaning that if a character scores especially high or low on a particular trait continuum, embodiments may consider that trait to be more relevant to the character's overall personality than a trait in which the subject scores in the middle of the scale. Some embodiments of the algorithm may consider a "dominant trait" one in which a character scores either a 1.0 or 1.5 on one end, or a 4.5 or 5.0 on the other, i.e., at or very close to the "extreme" on that trait. Those traits may be then weighted, e.g., by three times—given three times the importance—in assessing the overall percentage match. Some implementations may also take the sum of the square of the differences of each numerical variation in a given trait in order to "smooth out" the matching results.

FIG. 2 shows how this example of weighting works in some embodiments. As shown, Character 1 is in the left column. (These are the actual traits assessments for the character Ferris Bueller, from Ferris Bueller's Day Off, played by Matthew Broderick.) Character 1 is being matched to Character 2. (Character 2 is Tyler Durden from Fight Club, played by Brad Pitt.) The weighting factor is applied in this example for each trait on Character 1 with a score of 1.0, 1.5, 4.5 and 5.0.

As shown in the third column in this example, note the "% Match to Character 1." That is the % Match as determined by the difference in each individual trait value, as explained above. For each dominant trait of Character 1, that % Match of Character 2 to Character 1 is multiplied by 3, the "Weighting Factor," which is in the next column. If it is not a dominant trait, i.e., any trait value from 2.0-4.0 in this embodiment, the % Match is simply multiplied by 1. The product of these two columns (the % Match times the Weighting Factor) generates the last column to the right, "% Match with Weighting Factor," in this example.

After all 26 traits have been compared in this fashion, in some embodiments, the sum of the last column ("% Match with Weighting Factor") may be divided by the sum of the previous column, the total number of Weighting Factors, which again is a 3 for each dominant trait and a 1 in all other cases, in some embodiments. (Other embodiments may be tuned to provide different experiences by adjusting these thresholds.) The overall result is a % match out of 100%, in this case 67.7%. That is a relatively low % match in the universe of data, because these two characters are not especially similar.

The weighting in this example can cut both ways, either raising or lowering the overall match % by a disproportionate amount as appropriate, as shown in the second trait in the example match, Cocky/Arrogant (1) vs. Humble (5). Character 1 is a 1.0 on this trait, so it is a dominant trait. Character 2 is also a 1.0, which is a 100% match. That 100% is counted three times to determine the overall match percentage. In contrast, the for sixth trait, Optimistic/Trusting (1) vs. Cynical/Untrusting (5), Character 1 is a 1.5 on this trait, so again it is a dominant trait and will be weighted three times. However Character 2 is a 5.0 on that particular trait, a large difference of 4.5, for a mere 12.5% match. That 12.5% is also counted three times, which lowers the overall average dramatically.

Other techniques may be used to match. In some cases, to match, embodiments may calculate a difference between each corresponding scalar in two vectors and aggregate the differences (e.g., a root mean square difference for each pair of 26 scalars in two vectors). Some embodiments may match based on a count of traits scoring within some threshold of one another. Some embodiments may match characters to other characters and users to characters based on proximity in vector space. For instance, matches and rankings may be based on Euclidian distances between these vectors. Some embodiments of CharacTour may be operative to receive a user-trait vector along with a request to match that user to character profiles; calculate a Euclidian distance between the user's trait vector and trait vectors for each of the character records in memory, rank the character records by distance (ranking those that are closer higher, providing the highest ranking result, or providing those results ranking above a threshold), and send the user device instructions to present the ranked list. Similarly, embodiments may match characters to characters based on this Euclidian distance between the trait vectors (e.g., ranking those that are closer higher, providing the highest ranking result, or providing those results ranking above a threshold).

Some embodiments may be configured to perform cluster analysis on user or character records (e.g., with a DBSCAN or k-means analysis) within the attribute vector space to identify clusters of characters or users and present the results on a user device. For instance, some embodiments may organize these clusters according to archetype records, each archetype corresponding to a cluster. Some embodiments may identify for users their archetype based on the closest archetype cluster to that user's trait vector. Example archetypes being "the hero," "the rebel," "the jester," etc. In some cases, cluster analysis may be performed in multiple passes that sub-cluster each cluster with varying parameters specifying the degree to which to vectors must be proximate to one another to belong in the same cluster. The sub-clusters may be stored in an archetype hierarchy, specifying a taxonomy of character types to which users and characters may be matched. For instance, a character may fall within the archetype of "hero" and the sub-archetype of "tragic hero." Embodiments may be configured to send user devices instructions to display a character's archetype and display the closest archetypes for a user's profile.

Thus, some embodiments of CharacTour 10 may track user's behavior by personality to improve the recommendations. For example, after users take a personality quiz and are plotted on 26 traits, some embodiments track that personality info along and analyze the user's behavior on the site, e.g., what movies/TV shows/books does that user (and others with a similar personality profile) buy/download? What individual character pages do they spend the most time on? What characters do they rate high or low? On what character pages do they comment and/or which characters do they comment about the most? In some cases, media may be identified by performing a collaborative filtering analysis on user profiles to identify users similar to a given user and then recommend to the given user media that the similar user preferred. Thus, from that acquired data, embodiments may predict that users of a particular personality type (as determined by the results on our quiz) tend to like/dislike certain characters, not simply because they say they do, but because their behavior shows it to be true. Predictions may be performed at run-time or to reduce latency, as a batch process in advance of receiving a user request for predicted characters or users a given user may wish to view.

Embodiments may further feed this information into the matching algorithm in the "Personalized Match" subsection of the "Get Matched" interface, which in some implementations is the character matches/results a user receives after taking the personality quiz. Some embodiments then will not only tell users (via a web page sent to a client device) what characters are most similar to them on our 26 personality traits, but also what characters the received data tells CharacTour that users like them (according to personality quiz results) tend to like. Thus, the character results will truly be individual, personalized matches for users of a particular personality profile. Embodiments, however, are not limited to systems that provide these advantages, as various other aspects are independently useful, which is not to suggest that any other feature may not also be omitted in some embodiments.

Some embodiments may further allow users to identify/sort other users based on their personalities (e.g., the trait vectors). In such embodiments, once CharacTour has plotted users on the 26 personality traits via the quiz, some embodiments may allow (e.g., send an interface by which the user may send a command, receive the command, and provide the requested data to the client device) users to see how closely other users match their personality on a percent matching scale, e.g., with matcher 20. In some cases, a user profile may include a value by which users allow that to be seen (via opt-out or opt-in privacy options and settings stored in a corresponding user account of CharacTour).

For example, if a user looks at a comment by another user, or goes to that user's personal "profile" page, the user may wish to see the percent match that other user is relative to him/her, given their respective results on our personality quiz. Embodiments may then take any of a variety of actions to accommodate this desire (e.g., in response to a corresponding user request): like sort comments by how "similar" the commenter is to the user on our personality scale. Similarity may be determined based on the above-described matching techniques. Users in some cases may be inclined to give more weight to the views of other users that our personality analysis/matching algorithm tells them are similar to them, or just be more inclined to reach out/interact with "similar" users on community forums, etc. Thus, some embodiments may filter and rank user comments based on Euclidian proximity of trait vectors.

In some cases, users may be presented with information about media items in which characters appear. Such information, and in some cases, the media items themselves or affiliate links to media items sold by third parties, may be stored in the media items repository 40. In some cases, each media item may have a record indicating the characters in character repository 36 that appear in the media item.

Embodiments are not limited to recommender systems for media (e.g., fiction or non-fiction media). The present techniques have applications to comments sections and online communities in general, regardless of the subject matter or industry. For example, some embodiments may sort restaurant recommendations, or reviews of doctors, or comments on a news/sports/entertainment site, by how similar the personality of other users are to your personality.

Some embodiments of CharacTour include a character designer 22. Accessing this module may be one of the options in a "Get Matched" section of the website. Specifically, in some embodiments, a user may select 1-5 individual traits that they want their ideal character to have (e.g., on a trait selection interface sent from CharacTour to a client device, the interface being configured to send the user-entered data back to CharacTour, which stores the data and takes subsequent actions in response to cause results to be presented on the client device), from the list of traits. In some cases, each user selection may correspond to a trait value on the extremes of each of the 26 traits, so 26×2=52 trait extremes corresponding to binary selections of traits.

Then, some embodiments may calculate results that show (upon being sent to the client device with instructions for display) the characters that rank the highest in a combined average of those particular traits, with "highest" meaning "most extreme" in some implementations. So in some applications, a 1 and a 5 have the same value, and are the highest possible score on a given trait; followed by a 1.5 and a 4.5, and so on. With the mathematical caveat that, in some embodiments, a character may need to score at least a 2 or below, or a 4 and above, on each trait selected to be included in the overall results. Thus, proximate characters may be filtered based on an additional threshold.

Some embodiments of CharacTour may include a mashup module 24. This may be another option in the "Get Matched" section of the website. To use this feature, in some examples, a user would first be prompted (by a user interface sent from CharacTour to the user device) to select two characters from CharacTour's database of character records, and in response, the mashup module may "mash them up" to get new matches. Mathematically, CharacTour may construct two separate "Similar Characters" comparisons of the trait vectors and then average them to produce a synthetic character trait vector. In one example, if a user inputs Jerry Seinfeld and Michael Corleone into the mashup, the results may be sorted by which characters have the highest average percent match to the two of them. So in one example, if Ron Burgundy (for instance) is a 95% match to Jerry Seinfeld and an 85% match to Michael Corleone, Ron Burgundy would show up as a 90% match (the average of 95% and 85%) in the mashup results.

Users may then add up to three more characters into the mashup, for a total of five. Mathematically, in some embodiments, the principle remains the same with more input characters—for instance, characters may be sorted in the results by their average percent match to all of the characters entered into the mashup. In other embodiments another measure of central tendency different from averages may be used, e.g., median or mode values or trimmed-averages excluding extremes.

Some embodiments of the website served by CharacTour 10 may include a "Browse" section, e.g., presenting results by plot challenge. CharacTour may be responsive to user requests to search for characters based on the "challenge" those individual characters face in their movie/TV show/book/etc. In some cases, CharacTour stores in memory 30 main categories of "challenge" (including Coming of Age, Crime, Love, etc.) and approximately 200 subcategories to those categories. The subcategories may allow one to drill down relatively specifically. The challenges may be stored in a hierarchical taxonomy of challenges, each challenge reflected in a challenge record that identifies higher or lower-level challenges that are related and includes a prose description of the challenge. In some cases, each character record in repository 36 may include an identifier of the media (e.g., having a record in repository 40) in which the character is present and an identifier of a corresponding challenge record that describes the challenge faced by that character in the media.

For instance, a challenge of "Love" may have 23 subcategories, including characters dealing with an "Age Gap," "Torn Between Two Lovers," "First Love," "Commitment Issues," etc. A user may instruct CharacTour to add any or all of these subcategories to their search, and CharacTour may respond by selecting filtering characters responsive to the search according to the challenge specified, returning and upranking characters facing the challenge specified. Embodiments may do this in some cases by "tagging" the plot information of movies/TV shows/books/etc. in a detailed way that is focused on the character.

Characters may be coded as having trait scores with a variety of techniques. Because characters in media (and especially fictional characters) generally cannot self-report their traits, some embodiments may use human reviewers. For instance, a character-coding workflow module 18 in CharacTour may assign media to human reviewers (or receive selections of media by human reviewers); send survey interfaces by which human reviewers submit (using a client computing device, e.g., with a web browser executing on the client) lists of characters and attributes of those characters for the assigned/selected media; and aggregate responses in memory, e.g., by creating new character records and populating those records with data from the human reviewer.

In some cases, each human reviewer who assesses traits receives two calibration documents (e.g., presented in web pages, native mobile application interfaces, or paper documents). The first is a written description of the 26 traits, with detailed explanations of each extreme and examples of characters who fit that extreme, as listed below. This calibration data set lets the human reviewer know what they are measuring with each trait and what characteristics and behaviors to look for in a character to choose the appropriate numerical value. The calibration document is helpful to ensure that that the philosophical approach is consistent for each character in the CharacTour universe, which makes the results more comparable than coding by un-calibrated human reviewers. That said, not all embodiments use the calibration documents, which is not to suggest that other features may not also be omitted in some embodiments.

Table corresponding to a representative portion of calibration document 1:

| Extreme Trait | Comments | Examples |
|---|---|---|
| 1. Chatty/ Talkative (1) | They are "fast talkers" who can talk your ear off. In a movie trailer, he/she will do almost all of the talking. A character described as "outgoing" would be on this end of the spectrum but not necessarily on the extreme. | The Cable Guy, Janice (Friends) |
| 1. Reserved/ Quiet (5) | They can be shy and withdrawn. Or they may be confident but come across as aloof because they don't do small talk. | Mark Darcy (Pride and Prejudice), Carrie (Carrie), The Terminator |
| 2. Cocky/ Arrogant (1) | They think they are better than others, and sometimes they are. Many action heroes and pilots fall in this category. Female characters may be called "ice queens." In movies/books, they may get "redeemed" at the end by being humbled. | Han Solo (Star Wars), Catherine Trammell (Basic Instinct), Austin Powers, (Jane Austen's Emma) |
| 2. Humble (5) | They are extremely modest, maybe to a fault, and having a relatively low view of one's importance. Or maybe they don't call attention to themselves, despite having plenty to be proud of. | Harry Potter, Spiderman (who says "If I wanted all the glory . . . I wouldn't wear a mask.") |
| 3. Social Butterfly (1) | They are usually the center of attention -- popular students at school with a ton of friends, society types who are always at parties, or those who just enjoy being around others. | Van Wilder, Cher (Clueless) |
| 3. Loner (5) | They may be loners by choice - or because they don't fit in. They have few friends. | Lisbeth Salander (The Girl with the Dragon Tattoo), Batman |

The second calibration document the human reviewers receive is a sample traits assessment for a specific character, typically Walter White of the TV show Breaking Bad. An example is shown in FIG. 22. This shows the assessor an appropriate range of values across the continuum from 1-5, and teaches them to insert a comment to explain their reasoning behind selecting extreme values, or on other key trait decisions. These comments allow better oversight of the traits assessment, by pushing the assessors to "show their work" with examples that can be evaluated later by those checking and confirming the traits results.

In some cases, the human reviewers, referred to as traits assessors, may choose which characters they want to appraise. This way, the traits are being judged first by someone who knows the character intimately, along with the underlying movie, TV show, book or other work. Often, the person assessing the traits has also written a detailed profile of the character and so is especially familiar with the character thanks to both prior knowledge and research, and has also analyzed the character's personality in written form. The traits assessor may also consult outside analysis of the character conducted by a professional, such as by prominent movie/TV/book reviewers.

Based on their review, the trait assessors may enter their assessment of each character's traits (e.g., entering values for each of the 26 attributes) into CharacTour (e.g., by populating a web form served by CharacTour, populating a paper document, or creating an electronic document encoding the relevant values).

In some cases, after it is completed by the initial assessor, each set of traits data is reviewed by at least one person, and more often two or three people. In this example, the objective is to have one additional person who knows the character well—a "second pair of eyes"—verify each of the 26 numbers. This helps ensure accuracy and consistency of approach for all of the characters in our universe. In some cases, the workflow module of CharacTour tracks progress of a character assessment through reviews and creates to-do lists for reviewers at each stage. In some embodiments, via a web-based interface, each reviewer may view a list of items to review, view the content to be reviewed, and enter the result of their review. The final stage of review may cause a character record to be created in CharacTour and released for public consumption.

Some embodiments may assign traits to characters with natural language processing of the media (e.g., character dialogue from scripts/books, or (i.e., and/or) collections of character-specific quotes), and character descriptions) and systematic aggregation of user opinions working in concert with the more subjective/qualitative judgments made by human reviewers about characters that they know intimately.

Some embodiments of CharacTour may use sentiment analysis algorithms executed by text analyzer 30 to analyzing characters' personality traits. Sentiment analysis is the process of identifying people's attitudes and emotional states from the specific language they use. A field within Natural Language Processing, sentiment analysis is an automated task where machine learning is used to quickly determine the sentiment of large amounts of text or speech. To date, applications have included tasks like determining the mood of users who give online feedback; correlating statements about a political party with people's likeliness to vote for that party; or converting written movie reviews into 5-star scales. A text analysis module in CharacTour may automatically analyze certain keywords and phrases spoken by a character, typically from dialogue found in movie/TV scripts or books, and/or large collections of quotes by individual characters. And based on how often those keywords appear in the selected text, and their context, the computer program may assign a numerical value for a particular trait.

Sentiment analysis and/or other types of machine learning may be used to assess many of CharacTour's 26 traits. To illustrate, sample keywords are listed that may be used to analyze how sad a character may be: "sad"; "sadder"; "saddest"; "unhappy"; "unhappier"; "unhappiest"; "bitter"; "bitterer"; "bitterest"; "cheerless"; "dejected"; "despairing"; "despairs"; "despair"; "despondent"; "disconsolate"; "dismal"; "distressed"; "doleful"; "downcast"; "dreary"; "forlorn"; "gloomy"; "glum", etc. By scouring the reams of source material for these specific terms and typical variants, sentiment analysis is expected to help determine a character's numerical placement on Trait No. 10, Depressed (1)<==>Happy (5). The same process can be applied for many of our individual traits.

Approaches for other specific CharacTour-identified traits may include: "Crude"—keywords that include profanities; "Highbrow"—keywords that include "reading," "books," "museum," "art," etc.; "Drinking/Drug User/Gambler"—keywords that include "wine," "hungover," "booze," "cocaine," etc.; and "Talkative"—the word count of average sentences may be analyzed.

In some cases, keywords, or more generally n-grams indicative of traits may be identified algorithmically based on a training data set from text (e.g., character dialogue from scripts/books, or (i.e., and/or) collections of character-specific quotes) associated with characters coded by human reviewers. For instance, embodiments may identify n-grams that are relatively rare when a character has a particular trait and that are relatively common when a character has another trait. Based on probabilities measured from the training set associating n-grams to traits, embodiments may assign trait scores to characters outside of the training set.

Some embodiments may use the n-grams to execute queries for each personality trait. In some examples, CharacTour quantifies the number of times a given character uses words or phrases from the query. This numerical value may then divided by the total amount of words from the character's text. Based on the resulting frequency of n-grams, and the relative expected frequency of n-grams for each trait, characters may be scored for each trait. In some embodiments, for each set of personality traits, CharacTour develops a distribution curve (e.g., a histogram) based on the query results that correspond to a scale from 1 to 5. Characters at the middle (e.g., the exact middle or the exact middle plus or minus a threshold amount) of the curve may be assigned a "3", which is neutral. And the characters on the extreme opposite ends of the curve may receive either a 1 or 5, depending on the end of the curve at issue. For other characters, a numerical value may be automatically assigned given where a character's text percentage fits on the distribution curve (e.g., 1.5, 2.2, 4.6, etc.).

An example of n-grams in a query for the "determined" trait is presented below: accomplish* OR achieve* OR ambition OR ambitious OR battle OR battling OR beat OR beats OR "believe me" OR "bent on" OR "certain" OR certainly OR challenge* OR "choose" OR chose OR commit* OR compete OR competition OR complete* OR contest OR courage* OR decide* OR decision OR decisive OR determine* OR "do it" OR "do that" OR "don't give up" OR "don't quit" OR driven OR fight* OR "find answers" OR "find the answer" OR "find the answers" OR finished OR finish OR fix OR fixed OR focus OR focused OR halt OR "haven't given up" OR "get it done" OR "getting it done" OR goal* OR guts OR "I'm going to" OR "I am going to" OR "I can do it" OR "I can handle it" OR "I can prove" OR "I have to" OR "have the guts" OR "I believe" OR "I know" OR "I have the answer" OR impel OR "it's happening" OR "it is happening" OR lead OR leading OR leader* OR "let's do" OR "let us do" OR "make sure" OR "mean business" OR "moral imperative" OR "must" OR "my will" OR "my obligation" OR "my obligations" OR "no doubt" OR "never doubt" OR "not happening" OR "not gonna happen" OR "no way" OR "not over" OR "over my dead body" OR perfect OR perfection OR persevere OR persevering OR persevered OR plan OR plans OR planned OR planning OR practice* OR prepare* OR prevent* OR protest OR protested OR protesting OR purpose* OR "pull it off" OR pursuit OR "push forward" OR "pushed forward" OR race OR resolve* OR responsibility OR responsibilities OR run OR sacrifice* OR "set on" OR "single-minded" OR "stand up" OR "stood up" OR succeed OR success OR successes OR survival OR survive OR surviving OR survived OR "take care of" OR "take control" OR "this is it" OR "took care of" OR "took control" OR uncompromising OR "will not give up" OR "won't give up" OR "will not quit" OR "will win" OR "will solve" OR "won't quit."

As machines can process information much faster than any human or group of humans could read and analyze, this approach may be CharacTour's first step in assessing characters' personality in some implementation. Natural language processing is expected to provide an automated, consistent, scalable means of making personality appraisals across our ever-growing universe of characters.

Some personality traits are often harder for machine-based methods to assess, such as how "sexy" or "funny" a character is. To help with these judgments, some embodiments of CharacTour may "game-ify" the site so that users will aid with these subjective decisions by routines executed by gamifier 26. For instance, in a section called Rankings, embodiments may introduce users to a rapid-fire game (e.g., with time-constrained durations in which the user is to enter a value). They may be shown (with a website or native application on the client device executing instructions from CharacTour) two characters picked at random (e.g., with a pseudo-random number generator, like a linear shift register used to select character identifiers) and asked to choose which one is sexier (or funnier, more uptight, more honest, more outgoing, etc.) The three potential options will be to 1) vote for Character A, 2) vote for Character B, or 3) hit a button labeled "Don't Know/Don't Care." Responses may be sent to CharacTour and stored in memory for analysis. Then two more characters will automatically and rapidly appear with the same question and options, and so on, for as many iterations as the user is willing to participate.

Through this quick and fun game, CharacTour may collect enough data across tens of thousands of users to discover which characters users, collectively, consider the sexiest/smartest/most honest. Embodiments may track the "won/loss" percentage of each character across all showdowns in a particular category. For instance, Don Draper (of Mad Men) may win 95% of his "sexy" matchups; which would rank him as a "1" on the "Sexy (1)<==>Unsexy/Awkward (5)" scale, as would any character who wins 93.75% or higher of his/her meetings.

Embodiments may then assign numerical traits assessments on our 1.0-5.0 scale across the distribution of potential won/loss percentages. Such as, a character who wins between 81.25%-93.74% of his/her showdowns on this trait would score a 1.5; a winning percentage of 68.75%-81.24% would be a 2; 56.25%-68.74% would be a 2.5; 43.75%-56.24% would be a 3, etc. Thus a character who wins (and loses) exactly 50% in a particular "traits showdown" would receive a 3.0 on the scale, which is in the middle.

In addition to putting these "traits showdown" games on the site, some embodiments may obtain data through events hosted at various geographic locations. For example, representatives may travel to college campuses and other venues to enlist more users to play this game or seek such data through online questionnaires. The more data points collected, the more confident the system can be in the collective assessment of users on a particular trait. In some cases, each trait score is associated with a confidence score indicative of the sample size and variance of data upon which that trait score is based.

Between the machine-based language processing and the crowd-sourced collective opinion of users and survey participants, embodiments may algorithmically generate initial numerical assessments for most or all of the 26 identified traits.

In some cases, the algorithmic assessments may be subject to human review. Each set of traits data may be reviewed by two or three people trained in trait scoring, e.g., staff of the entity operating CharacTour. The objective of this review is to have someone, or several people, who know the character well—a "second pair of eyes"—verify each of the 26 numbers. For instance, consider Trait No. 10, Depressed (1)<==>Happy (5). This is a trait that is expected to be well suited for scoring by natural language processing. That corresponding algorithmically generated value may automatically be fed into the numerical traits assessment, unless human reviewers specifically justify "overruling" a result on a particular trait for reasons of editorial judgment. For example, perhaps the natural language processing determines a trait based on certain quotes that we subjectively determine, based on the human reviewers' deep knowledge of the character and his/her "world," were made while the character was under extreme and unusual stress, rather than reflecting a more stable, underlying personality trait. In this way the human judgments may still be called up to review and check the more mechanized processes of the first two steps of this example of a traits assessment approach.

Figure 1B:
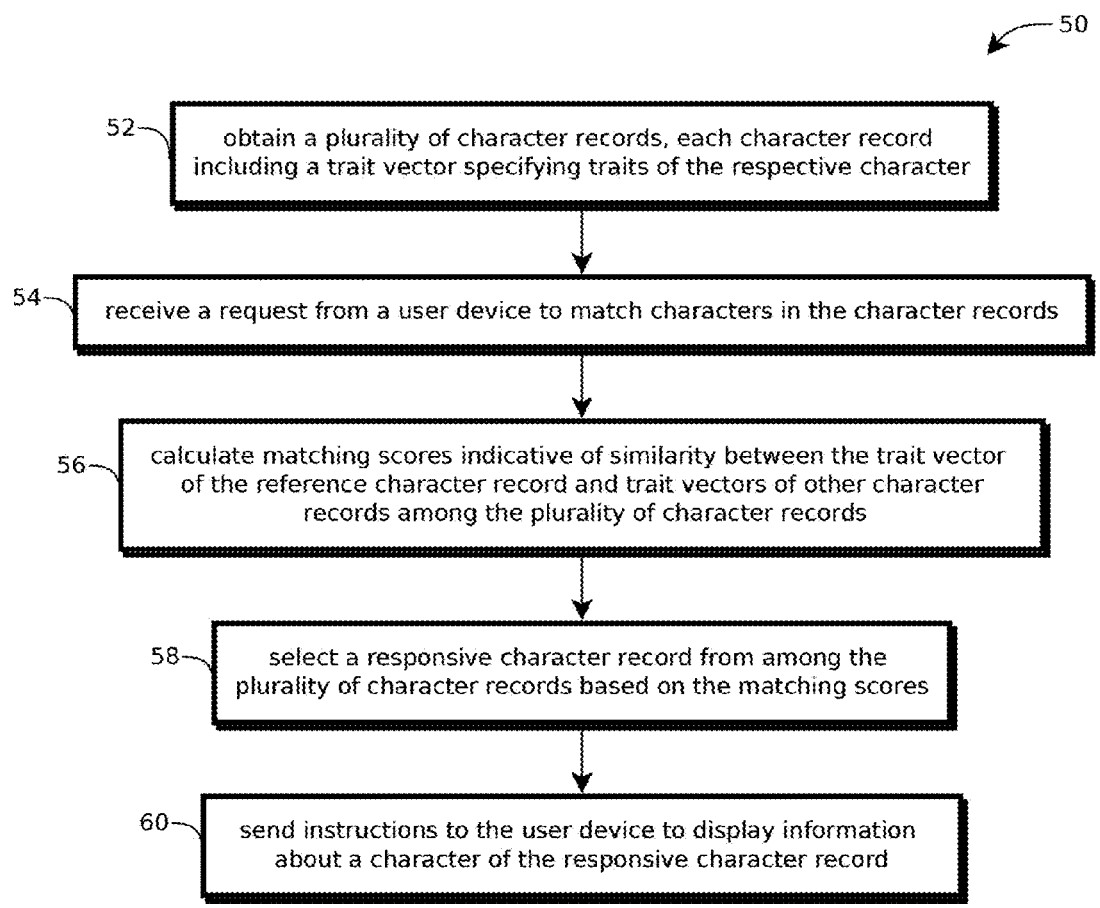
FIG. 1B shows an example of a matching process performed by some embodiments of the CharacTour system.

FIG. 1B shows an example of a matching process 50 performed by some embodiments of the above system. In some cases, the process 50 includes obtaining a plurality of character records, each character record including a trait vector specifying traits of the respective character, as indicate by block 52. The process 50 may include receiving a request from a user device to match characters in the character records, the request identifying at least one reference character record, as indicate by block 54. The process 50 may include calculating, with one or more processors, matching scores indicative of similarity between the trait vector of the reference character record and trait vectors of other character records among the plurality of character records, as indicated by block 56. The process 50 may include selecting a responsive character record from among the plurality of character records based on the matching scores, as indicated by block 58. Finally, the process 50 may include sending instructions to the user device to display information about a character of the responsive character record, as indicated by block 60.

Various user interfaces and reports referenced above and generated by CharacTour for display on client devices are shown in FIGS. 3-21. It should be noted that when it is said content is sent, provided, or the like, to a client device, such discussion encompasses use of (e.g., sending links for) content delivery networks that host content geographically closer to users to reduce latency.

Figure 3:
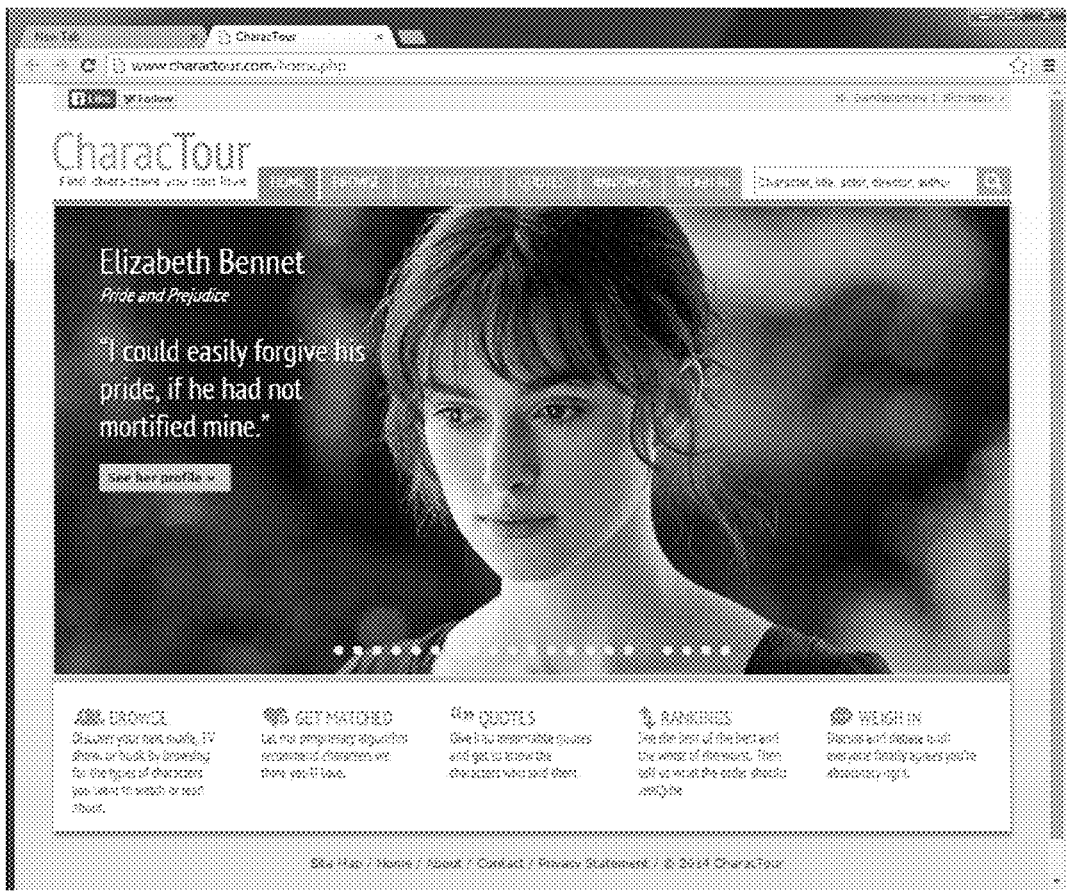
FIG. 3 shows an example of an initial view presented when a user navigates their web browser to the CharacTour system 10.

FIG. 3 shows an example of an initial view presented when a user navigates their web browser to the CharacTour system 10.

Figure 4:
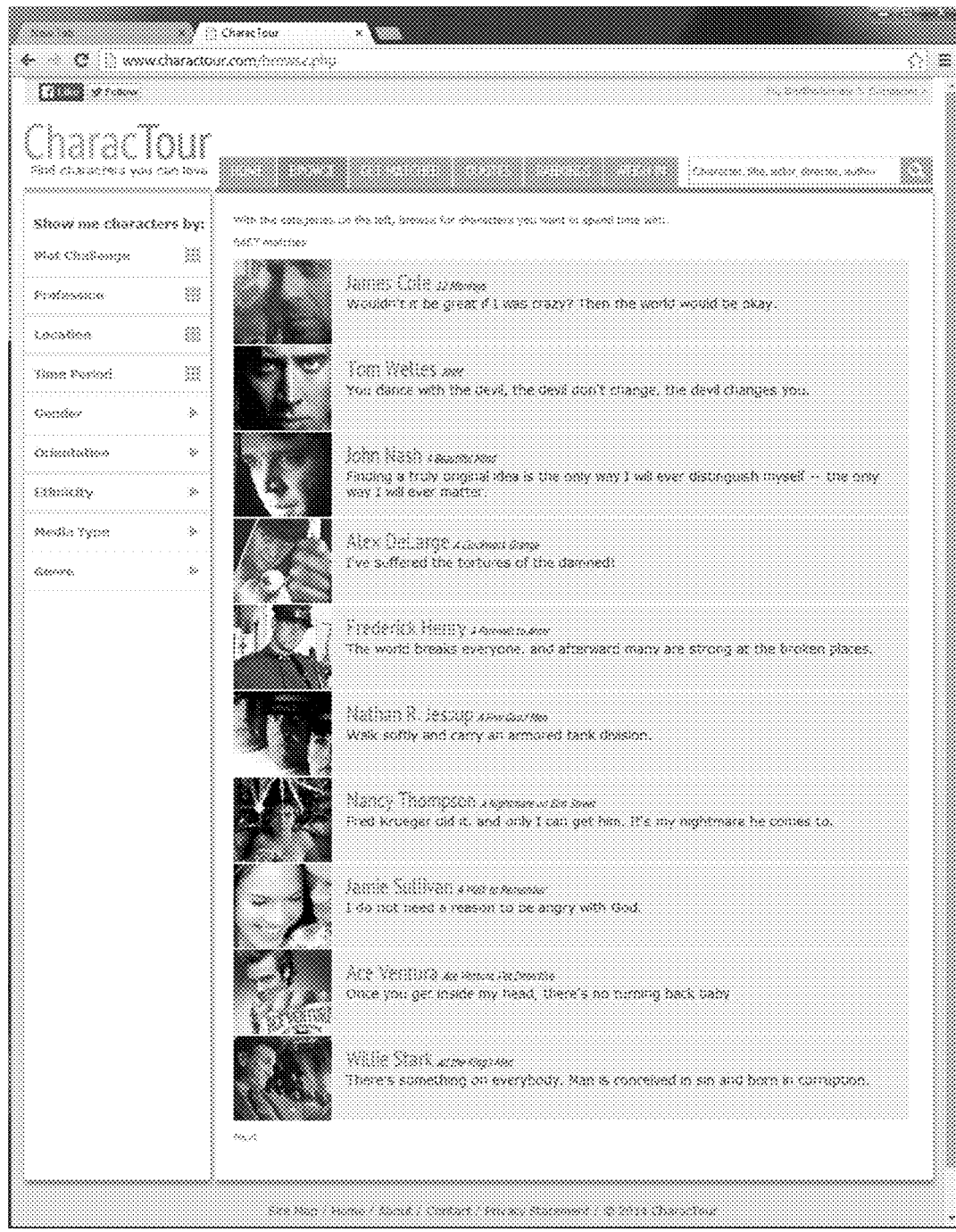
FIG. 4 shows an example of a browsing interface by which a list of characters are presented. In some cases, the list may be populated based on a user profile, specific to the user viewing the interface, or based on a ranking of characters according to the frequency of views across all users (or all users sharing a similar user profile, like in the same country, region, or speaking the same language)

FIG. 4 shows an example of a browsing interface by which a list of characters are presented. In some cases, the list may be populated based on a user profile, specific to the user viewing the interface, or based on a ranking of characters according to the frequency of views across all users (or all users sharing a similar user profile, like in the same country, region, or speaking the same language).

Figure 5:
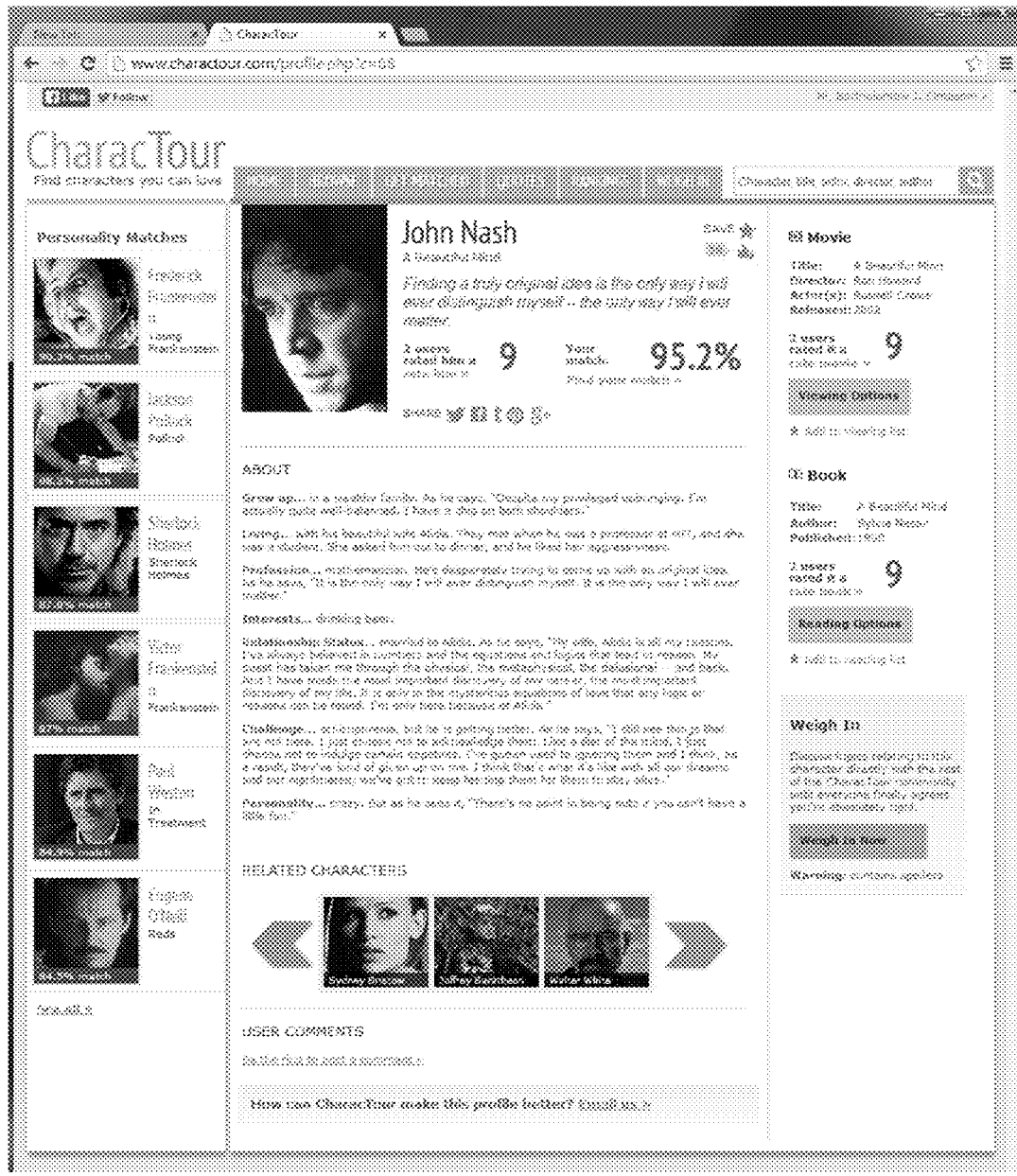
FIG. 5 shows an example of a character interface for a single character, which may be presented responsive to selecting this character in the interface of FIG. 4.

FIG. 5 shows an example of a character interface for a single character, which may be presented responsive to selecting this character in the interface of FIG. 4.

Figure 6:
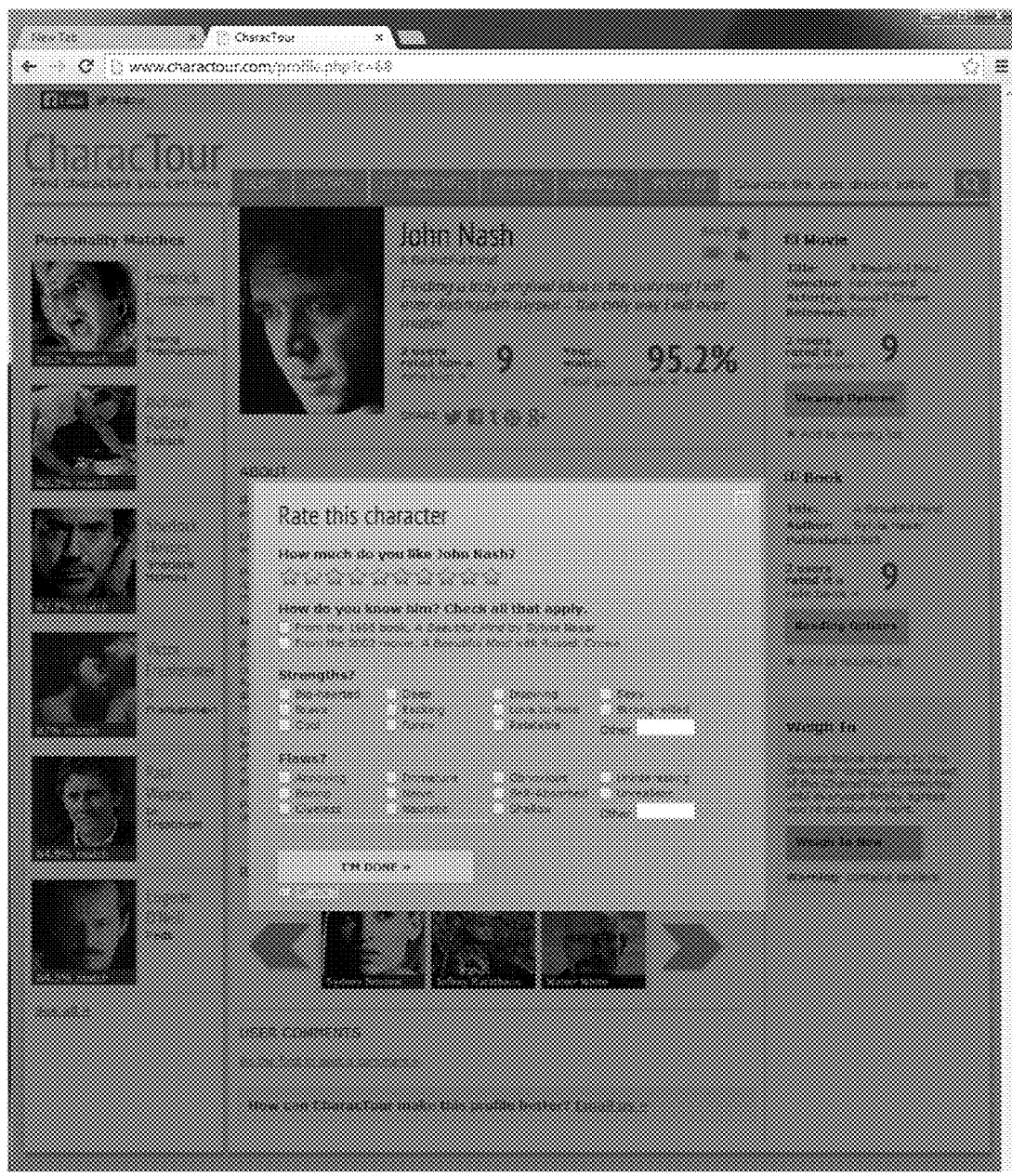
FIG. 6 shows an example of a user input form to rate the character at issue.

FIG. 6 shows an example of a user input form to rate the character at issue.

Figure 7:
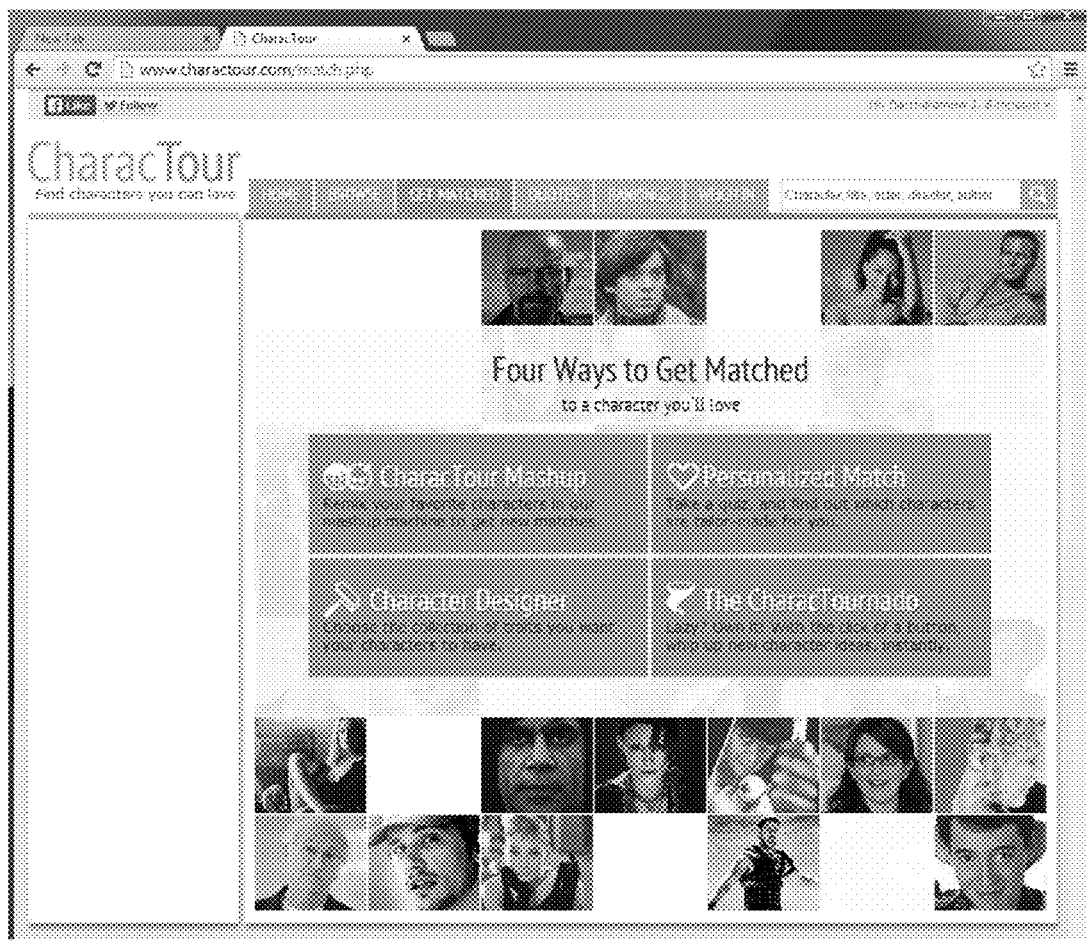
FIG. 7 shows an example of a matching-technique selection interface by which a user indicates how they would like to analyze information about characters.

FIG. 7 shows an example of a matching-technique selection interface by which a user indicates how they would like to analyze information about characters.

Figure 8:
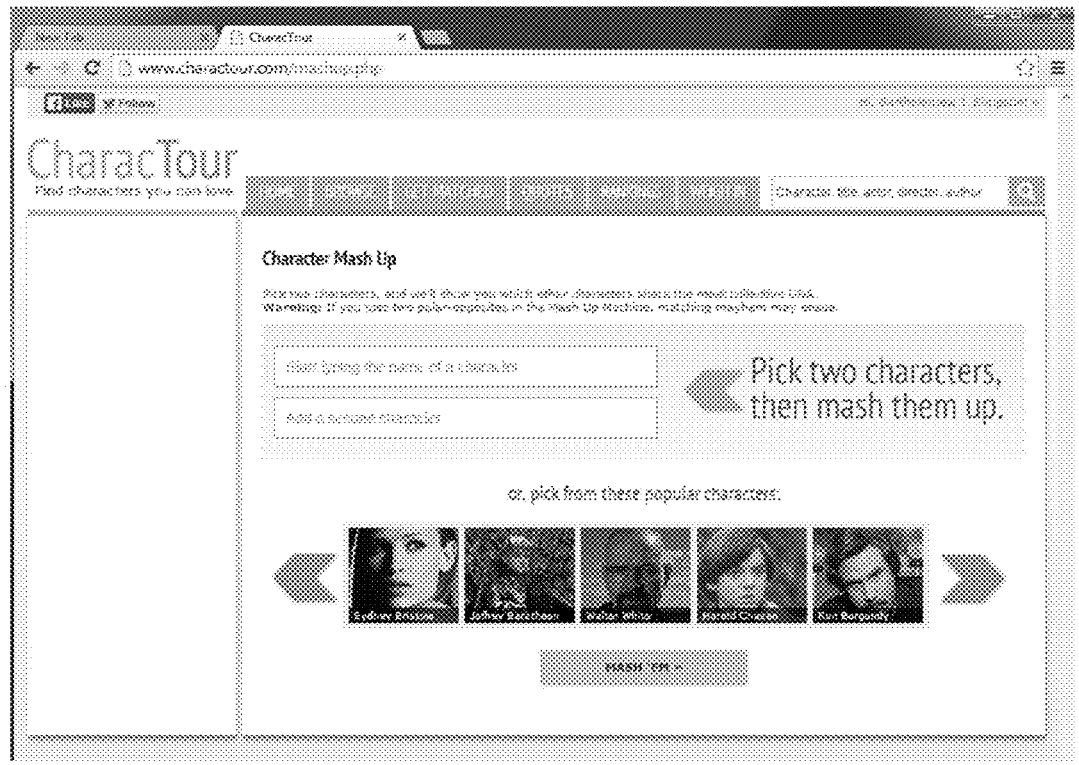
FIG. 8 shows an example of an interface by which a user identifies two characters to be combined in a "mash up"

FIG. 8 shows an example of an interface by which a user identifies two characters to be combined in a "mash up."

Figure 9:
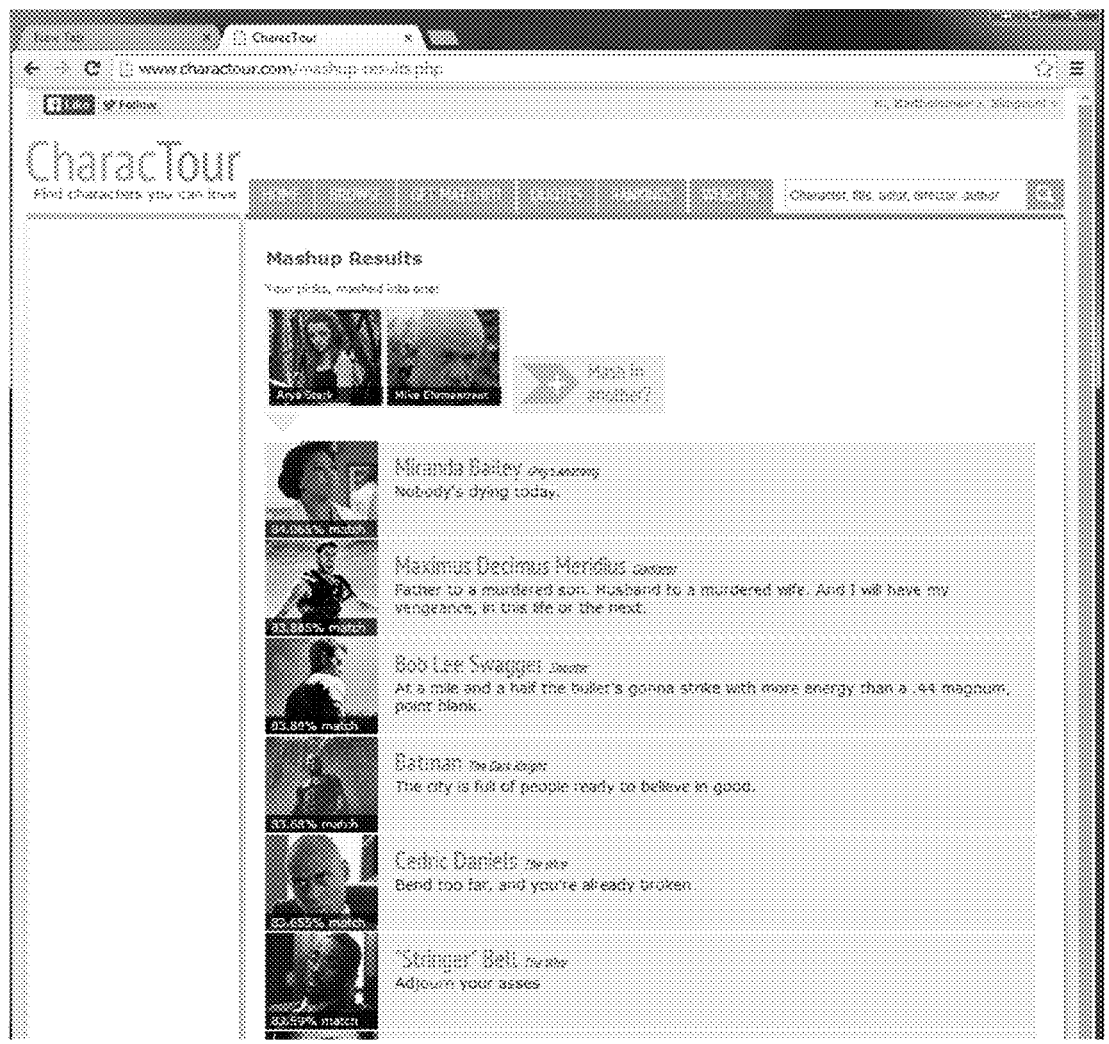
FIG. 9 shows an example of mash up results.

FIG. 9 shows an example of mash up results.

Figure 10:
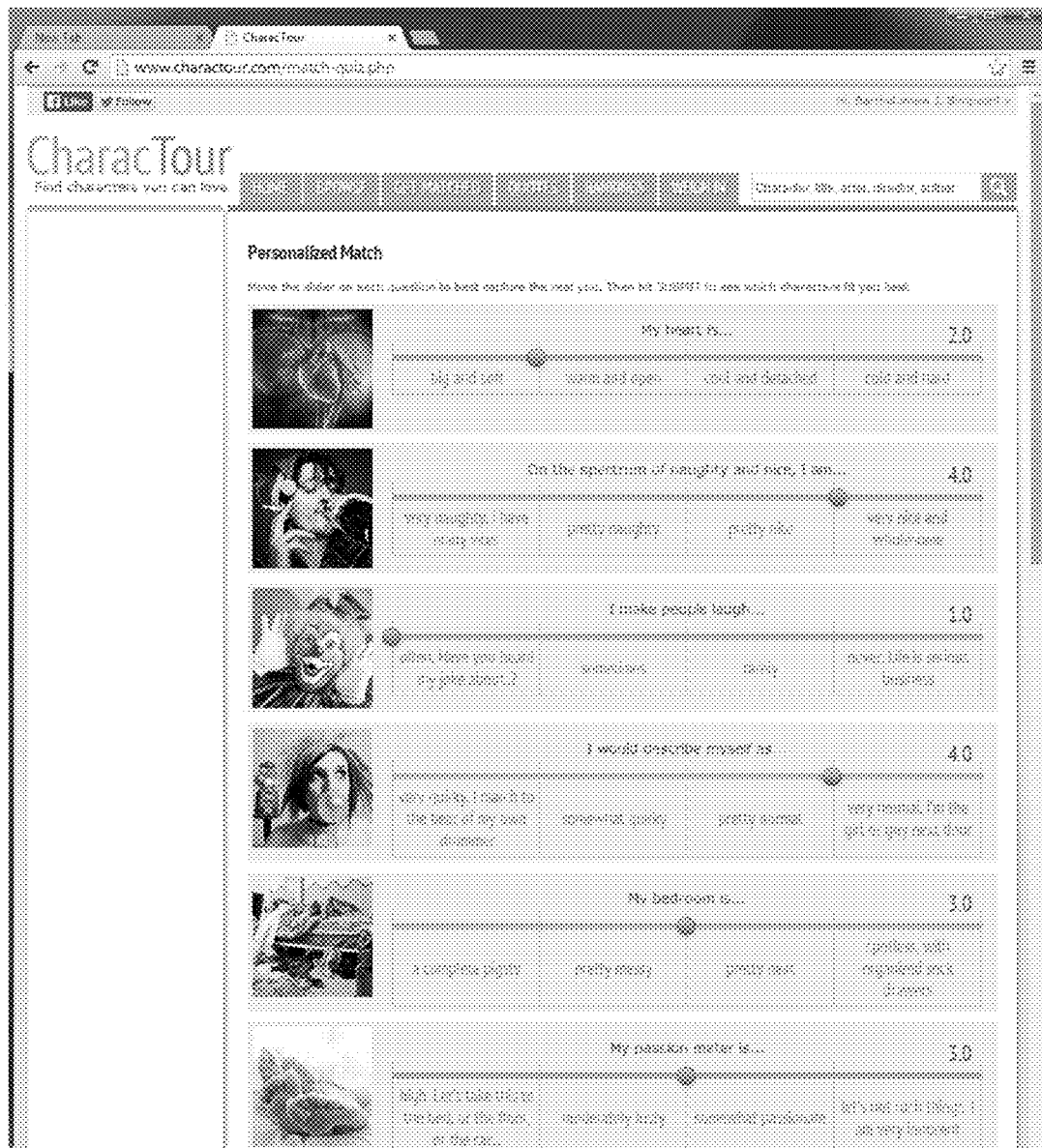
FIG. 10 shows an upper portion of an example of an interface by which a user specifies a personalized match.

FIG. 10 shows an upper portion of an example of an interface by which a user specifies a personalized match.

Figure 11:
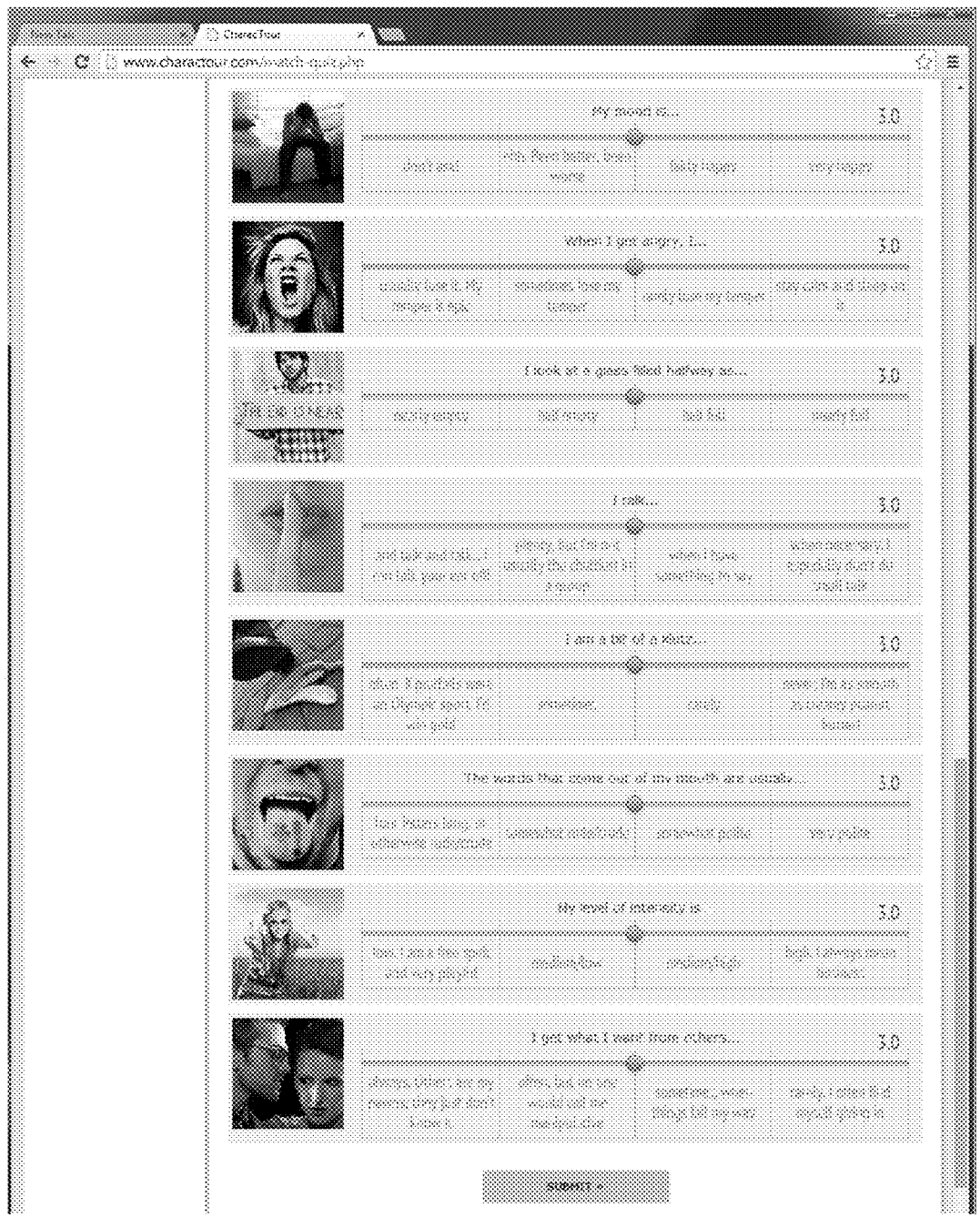
FIG. 11 shows a lower portion of the interface of FIG. 10.

FIG. 11 shows a lower portion of the interface of FIG. 10.

Figure 12:
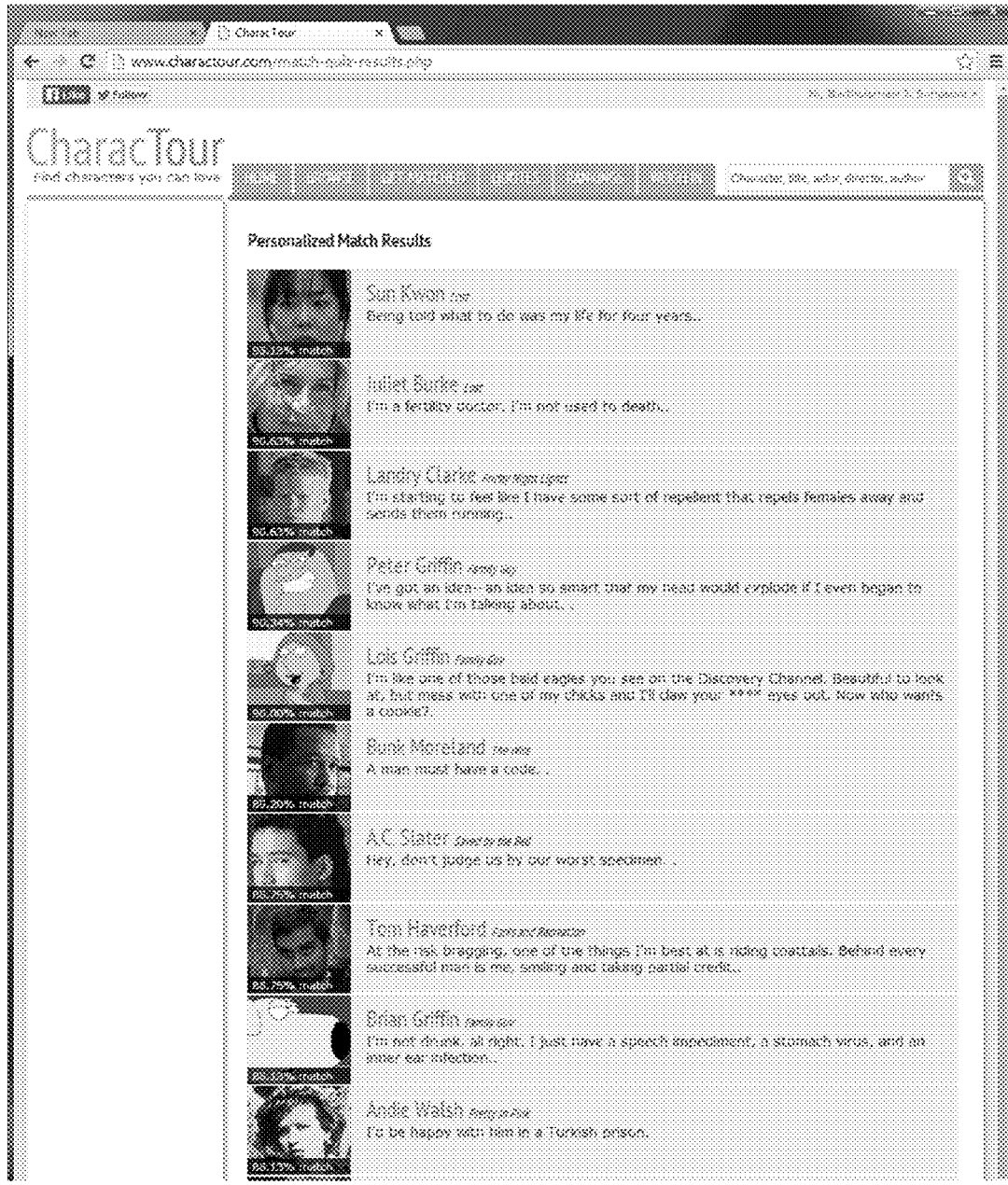
FIG. 12 shows an example of results of a personalized match produced responsive to data entered in the interfaces of FIGS. 11 and 12.

FIG. 12 shows an example of results of a personalized match produced responsive to data entered in the interfaces of FIGS. 11 and 12.

Figure 13:
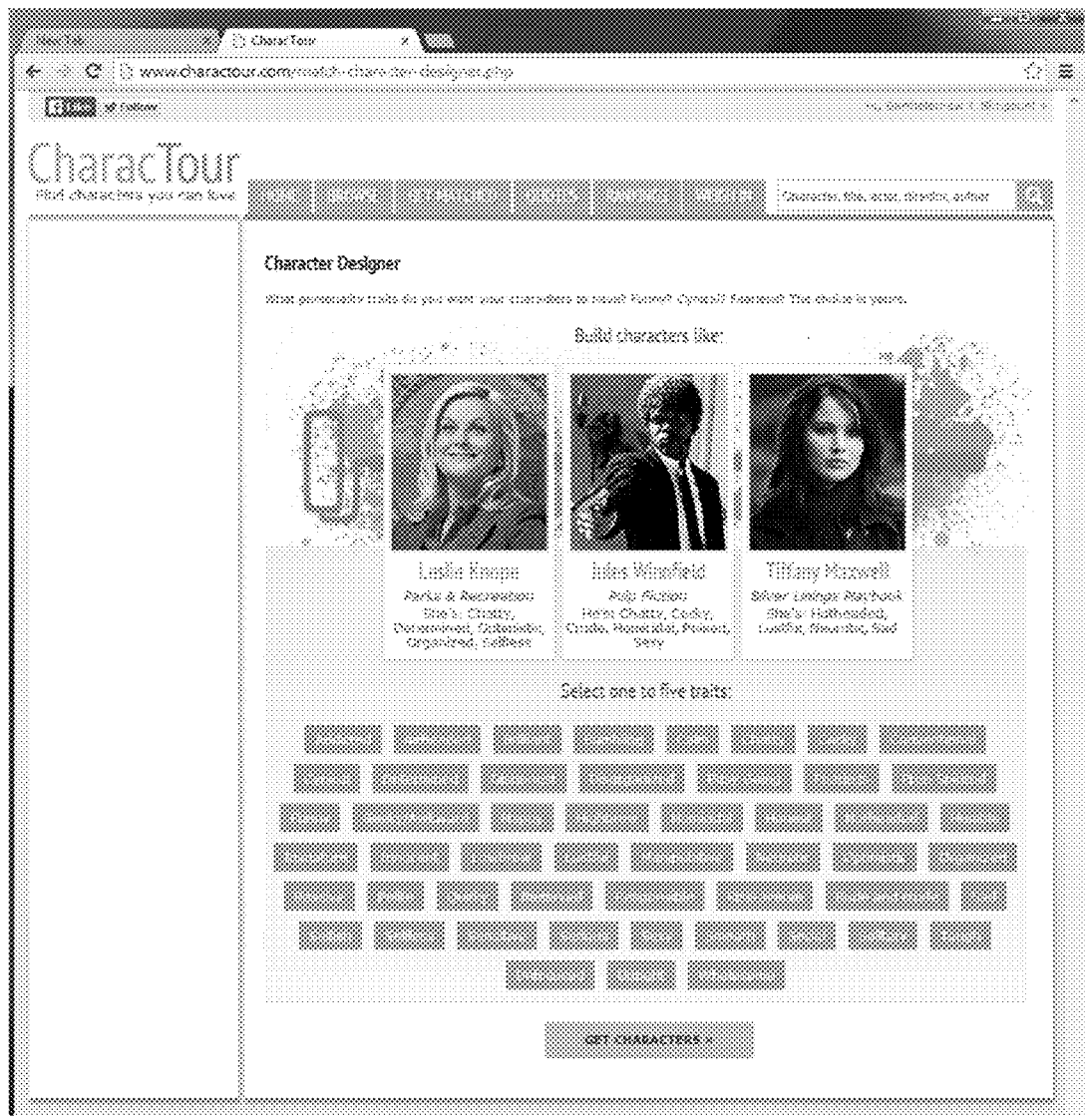
FIG. 13 shows an example of a character designer interface.

FIG. 13 shows an example of a character designer interface.

Figure 14:
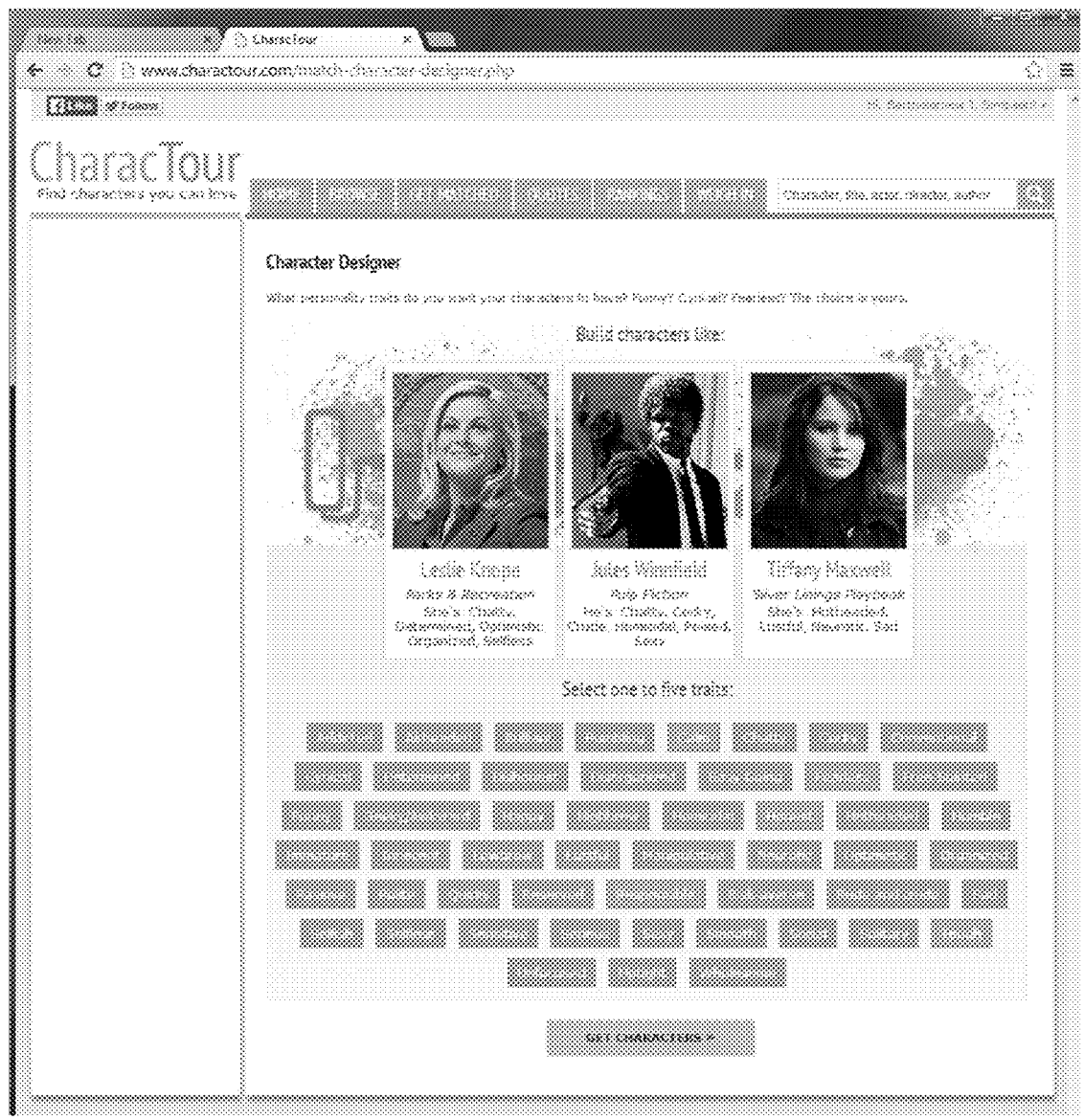
FIG. 14 shows the interface with the traits of "brilliant," "funny," and "fearless" selected and with a different visual weight.
Figure 15:
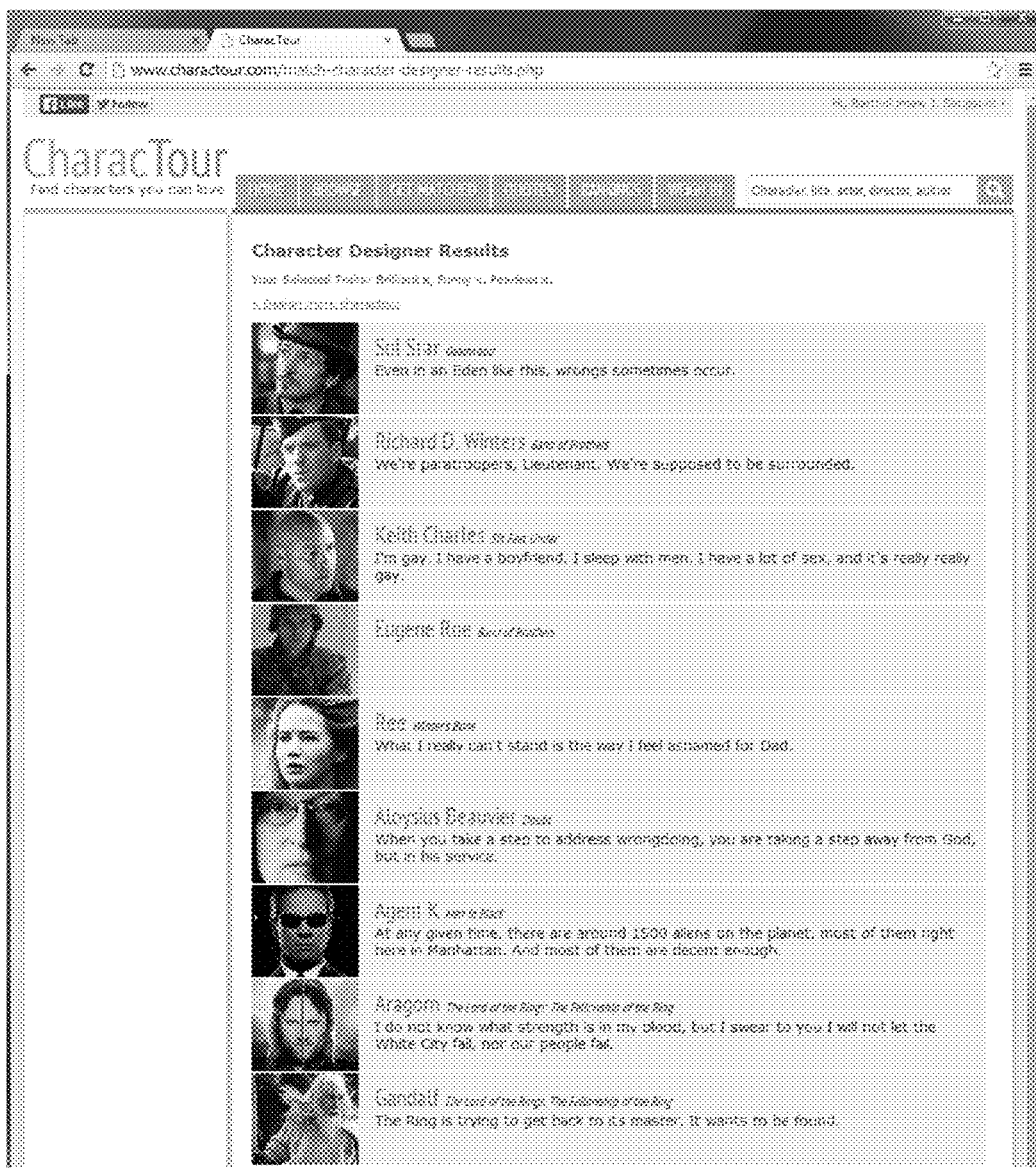
FIG. 15 shows an example of results of a character design specified in the interface of FIG. 13.

FIG. 14 shows the interface with the traits of "brilliant," "funny," and "fearless" selected and with a different visual weight FIG. 15 shows an example of results of a character design specified in the interface of FIG. 13.

Figure 16:
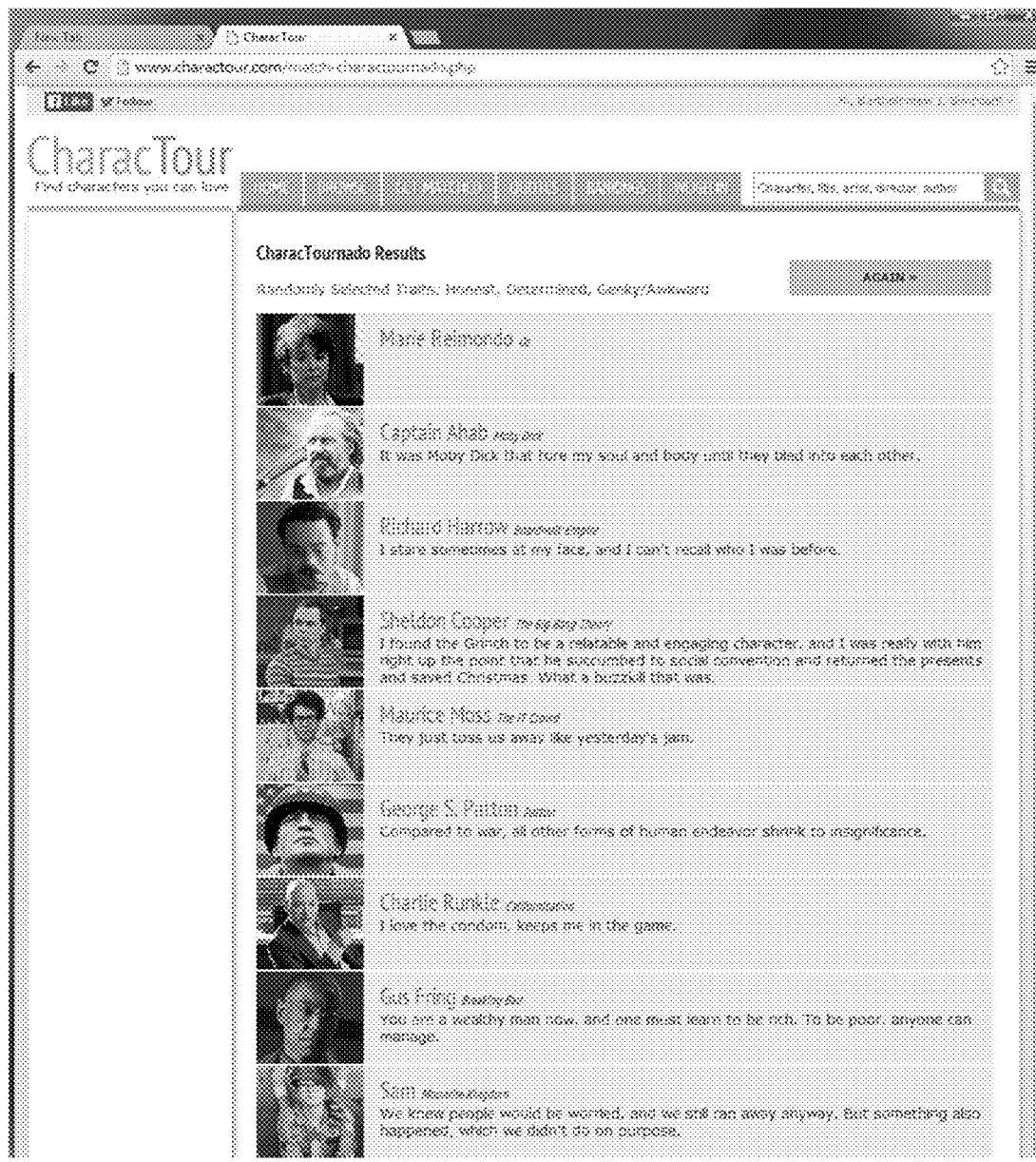
FIG. 16 shows an example of a list of characters generated by a user requesting selection according to a random array of traits.

FIG. 16 shows an example of a list of characters generated by a user requesting selection according to a random array of traits.

Figure 17:
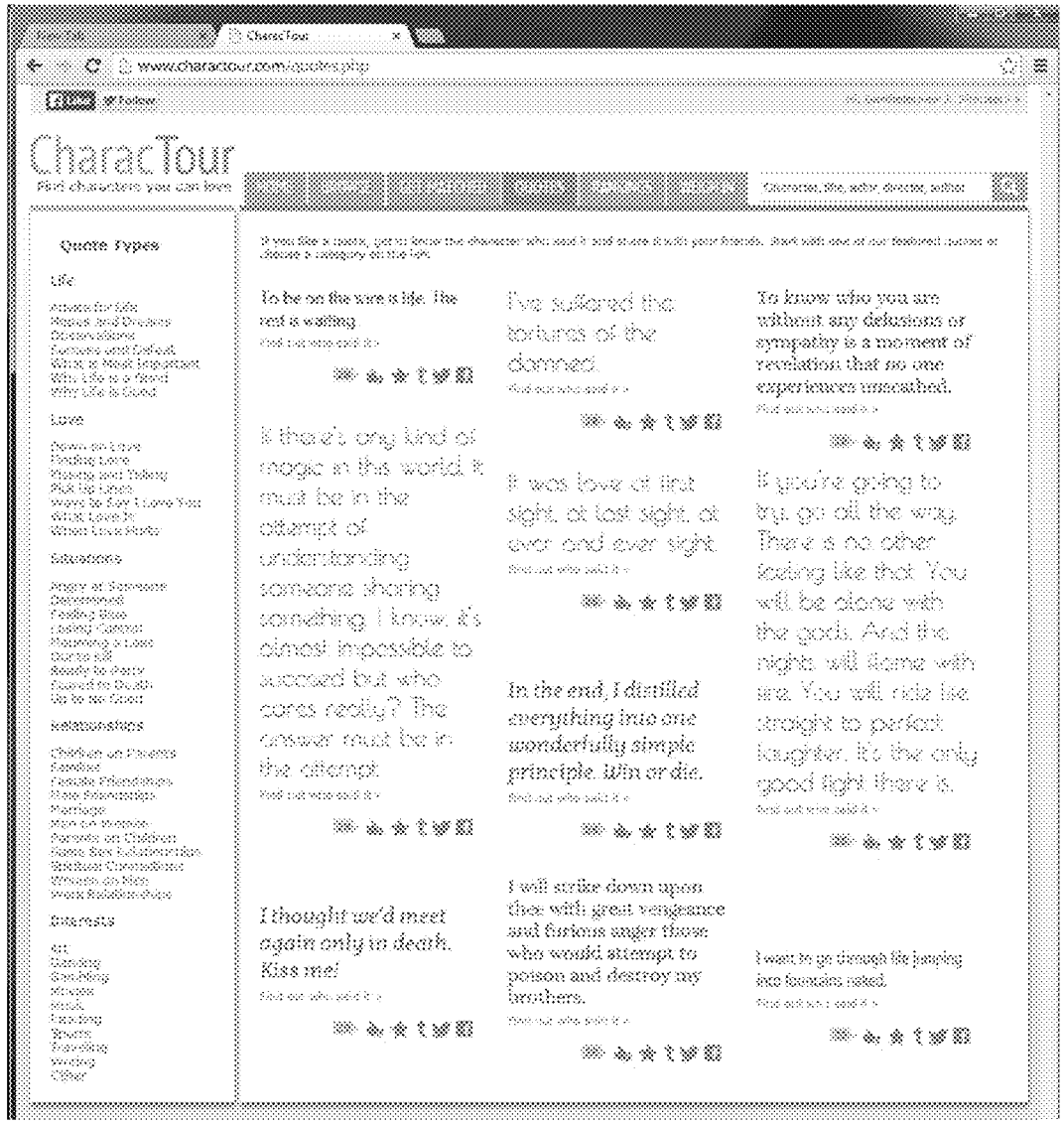
FIG. 17 shows an example of an interface presenting character quotes and by which a user may test their knowledge of characters or identify new characters.

FIG. 17 shows an example of an interface presenting character quotes and by which a user may test their knowledge of characters or identify new characters.

Figure 18:
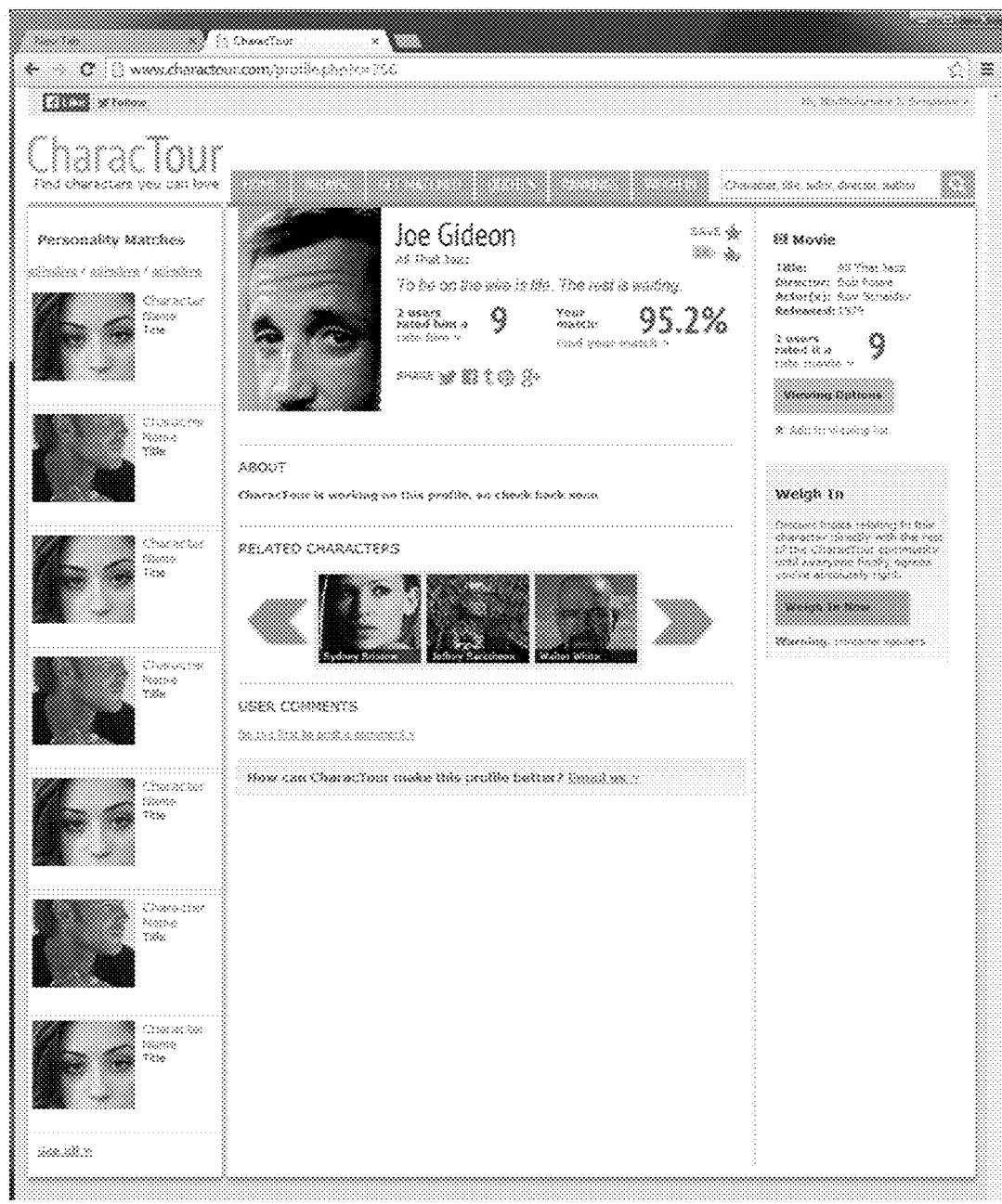
FIG. 18 shows an example of a character selected according to a quote in FIG. 17.

FIG. 18 shows an example of a character selected according to a quote in FIG. 17.

Figure 19:
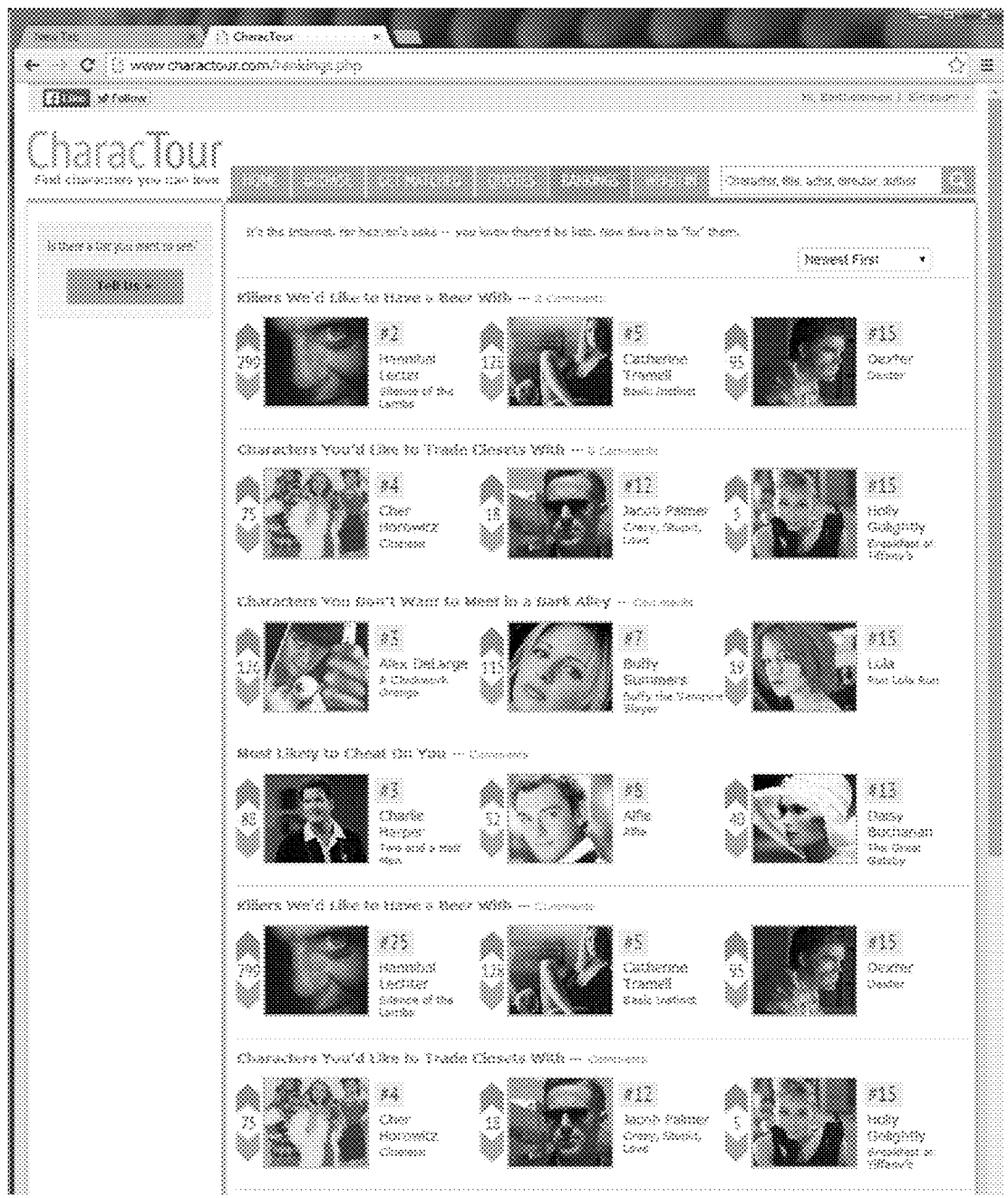
FIG. 19 shows an example of a collecting of character rankings according to various criteria.

FIG. 19 shows an example of a collecting of character rankings according to various criteria.

Figure 20:
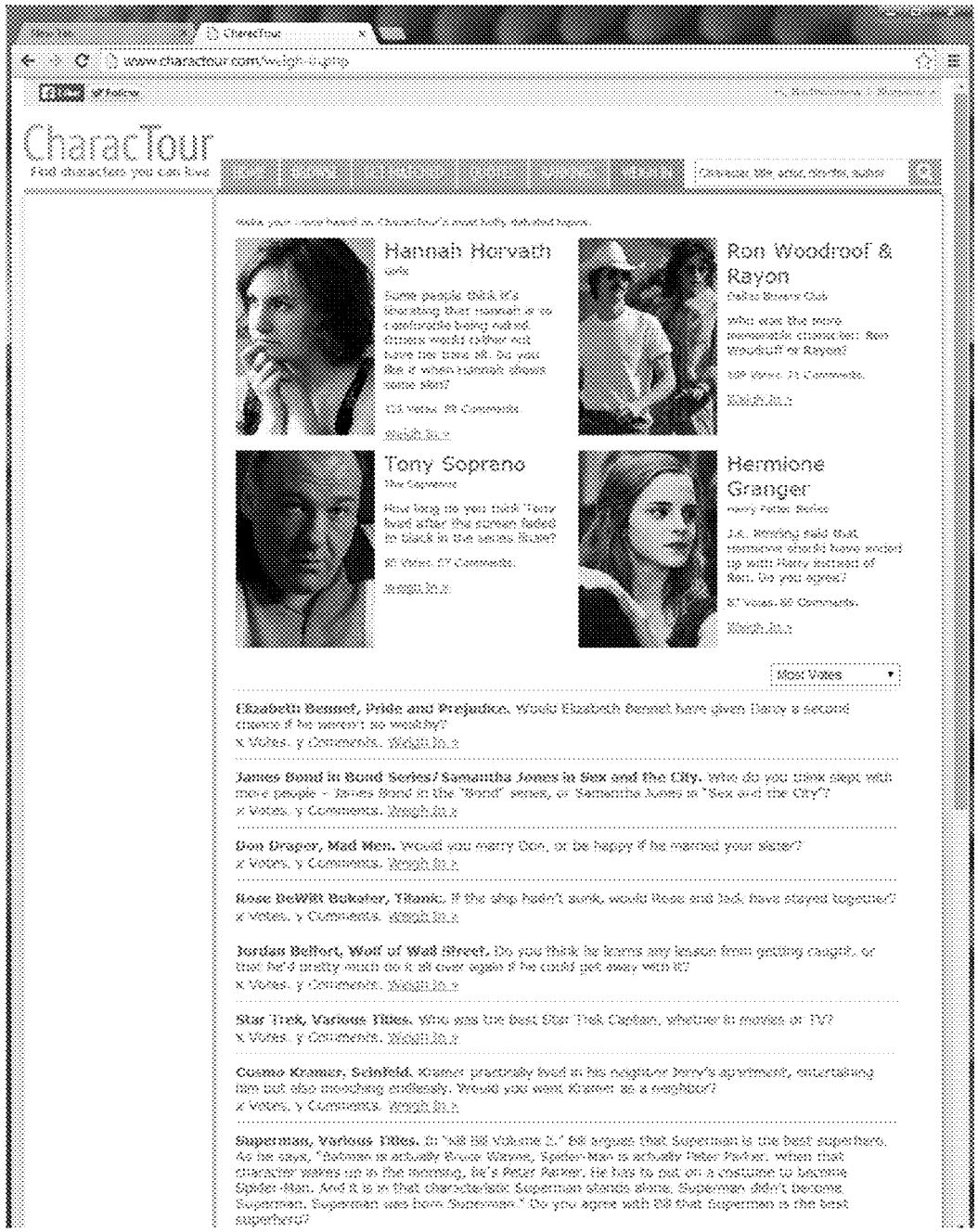
FIG. 20 shows an example of a messaging interface by which users may comment on various characters in records associated with those characters.

FIG. 20 shows an example of a messaging interface by which users may comment on various characters in records associated with those characters.

The models trained (or otherwise developed) with the techniques herein may have a variety of uses. In some embodiments, a natural language machine-learning model trained on text expressed by fictional characters may be applied to text expressed by non-fictional characters, e.g., to match, cluster, or otherwise classify real users (or other consumers) for various purposes, using the insights developed on fictional corpa to classify non-fictional people.

In some cases, a model (which may also be referred to as function in some cases) may be trained (or otherwise programmed) on a training set of text. The training set may include text expressed (e.g., written or spoken) by fictional characters (e.g., in a screen play, book, or closed captioning). Fictional characters in the training set may be associated with scores on various character traits, e.g., scores entered by manually scoring the characters. A model (which may include a plurality of models, like one for each character trait) may be trained on the fictional characters using the techniques described herein, e.g., by calculating n-gram counts of terms expressed by a character, calculating a trait score based on the n-gram counts with a candidate model, calculating an error based on a difference between the calculated trait score and the manually applied scores, and adjusting the candidate model (for instance, adjusting weights in a weighted sum) based on the error (e.g., in a direction that reduces the error locally). In some embodiments, the model may be trained with a stochastic gradient descent, using a manually classified set of characters and associated n-gram counts in the characters respective expressed text as a training set.

Some models may be improved with bootstrap aggregation or cross-validation to protect against over-fitting. In some cases, a portion of the training set may be held in reserve, the model trained on the non-reserved text, and the model validated after training by entering the reserved text into the trained model to determine if the reserved text yields the same (or approximately the same, like within a threshold difference) trait score or scores as the trained model or manual scoring. In some cases, the models may be subject to cross-validation by repeatedly training and validating, withholding different portions of the text in each iteration. In some cases, weights (or other parameters) of a plurality of models, each based on a different subset of the training text, may be combined and replaced with a measure of central tendency (like a mean, median, or mode) for the respective weights.

Once trained, the model may be applied to text from real (i.e., non-fictional) humans to assign trait scores (e.g., a trait vector) to non-fictional people. Text expressed by a given non-fictional person (e.g., a user) may be input into the model, and the model may output a trait vector (e.g., a collection of trait scores) based on language by that user corresponding to language used by fictional characters having certain traits. Text may be taken from a variety of sources, e.g., a person's publications (like an autobiography, memoir, editorials, and the like), a person's social media posts, a person's blog posts, a person's email correspondence, a person's product or service reviews, and the like. Text from one or more of these sources (or permutations thereof) may be input into the models trained on fictional characters, and a trait vector may be output for the non-fictional person.

The inventors expect that text by fictional characters is particularly well suited to training natural language processing models for scoring traits. Often fictional characters are subject to exposition and other discussion, often resulting in a consensus as to the presence of certain traits, which is likely to be reflected in relatively accurate trait scores in the training set. Further, fictional characters are often designed to exhibit traits, and this design is often implemented through word and phrase choice by authors. In some cases, relatively highly-edited, ostensibly non-fictional characters, such as politicians and reality television characters may express text that is similarly effective for training models to classify traits.

The natural language processing models described above may be used in a variety of scenarios. In some embodiments, non-fictional people may be matched to one another, like in a dating service or collaborative filtering service that algorithmically performs such matches. In some embodiments, two users may be matched by calculating their trait vectors with text expressed by the respective users and, then, calculating a Euclidian distance in trait vector space between the users' trait vectors. For example, the distance may be a square root of a sum of squared differences between respective trait scores. In some cases, matches may be established calculating Euclidian distances between a given user's trait vector and trait vectors of a plurality of candidate matches. The candidate match having the smallest distance among the plurality may be selected as the given user's match (or candidates may be ranked by distance), in some embodiments. In some embodiments, content or other users may be selected based on the matches and sent to the given user's computing device, e.g., in response to a query for the same.

In another example, the models may be used to cluster non-fictional persons into audiences, e.g., groups to receive advertisements based on having psycho-demographic characteristics sought by an advertiser. In some embodiments, trait vectors may be clustered in trait-vector space. Some embodiments may execute a density-based clustering algorithm, like DBSCAN, to establish groups corresponding to the resulting clusters and exclude outliers. To cluster according to trait vectors, some embodiments may iterate through each of the trait vectors for a collection of non-fictional people and designate a trait vector as a core vector if (e.g., if and only if) at least a threshold number of the other trait vectors are within a threshold distance in vector space. Some embodiments may then iterate through each of the trait vectors and create a graph of reachable trait vectors, where nodes on the graph are identified as reachable in response to non-core vectors corresponding vectors being within a threshold distance of a core vector in the graph, and in response to core vectors in the graph being reachable by other core trait vectors in the graph, where two vectors are reachable from one another if there is a path from one vector to the other vector where every link and the path is a core vector and is within a threshold distance of one another. The set of nodes in each resulting graph, in some embodiments, may be designated as a cluster, and points excluded from the graphs may be designated as outliers that do not correspond to clusters. In some embodiments, users may be clustered in advance of a query, and an advertisement or other content may be selected upon determining that a corresponding query is for a user in one of the clusters.

In some embodiments, an advertiser (or some other entity) may identify a non-fictional (or fictional) ideal (or target) customer or user and use the model described above to identify other, similar users or characters. Some embodiments may obtain text for target customer/user, e.g., that person's social media posts, email, memoirs, reviews, or the like, and analyze the person with the above-noted model to produce characteristic scores for that person. Some embodiments may then obtain text from a universe of other potential customers/users and calculate a numerical similarity score (e.g., a percent Alike rating) for all of those other people relative to that ideal customer. Or in some embodiments, the advertiser/entity may populate a personality quiz as if it was "answering" for its Ideal Customer, and then embodiments may compare the traits results from the text of a universe of non-fictional people to that Ideal Customer's results, to produce similarity scores figure for each member of that universe relative to the Ideal Customer.

In another example, non-fictional people may be classified or scored with the above-described natural-language models. For example, new users, rather than (or in addition to) self reporting trait scores, may provide access to their social media posts or email text (e.g., by signing in with an OAuth service provided by an social network or email service and granting corresponding authority to extract the text to input into the model). In some embodiments, such techniques may provide for a relatively fast, easy onboarding experience for some users.

Figure 21:
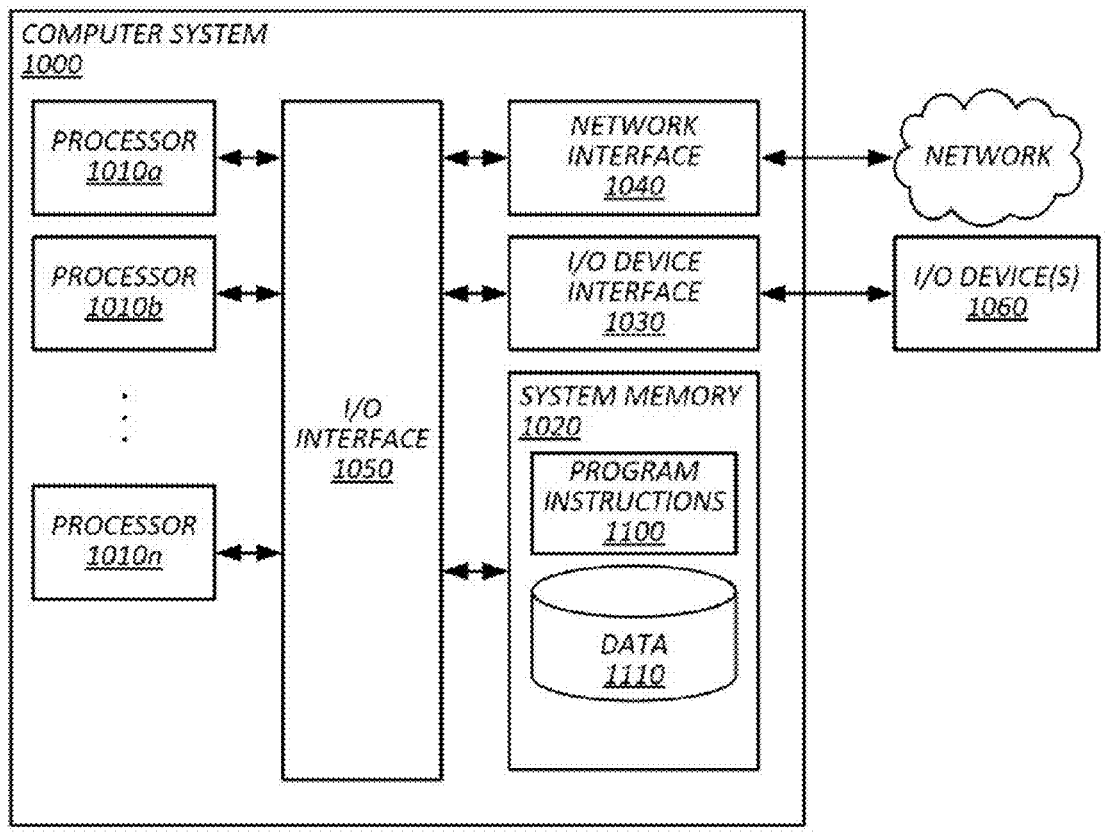
FIG. 21 shows an example of a computer system by which the present techniques may be implemented.

FIG. 21 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices).

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompass both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. The term "each" does not mean "each and every," unless indicated otherwise. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The present techniques will be better understood with reference to the following enumerated embodiments:

1. A method of matching media characters, the method comprising: obtaining a plurality of character records, each character record including a trait vector specifying traits of the respective character; receiving a request from a user device to match characters in the character records, the request identifying at least one reference character record; calculating, with one or more processors, matching scores indicative of similarity between the trait vector of the reference character record and trait vectors of other character records among the plurality of character records; selecting a responsive character record from among the plurality of character records based on the matching scores; and sending instructions to the user device to display information about a character of the responsive character record.

2. The method of embodiment 1, wherein obtaining a plurality of character records, each character record including a trait vector specifying traits of the respective character comprises: obtaining text of media containing a character; analyzing the text with natural language processing to score traits of the character; and constructing a trait vector for the character with the scored traits.

3. The method of any of embodiments 1-2, wherein obtaining a plurality of character records, each character record including a trait vector specifying traits of the respective character comprises: sending a user a character comparison interface requesting the user the compare two characters according to a trait; receiving a response indicating which of the two characters exhibits the trait more strongly; and adjusting a trait score for each of the two characters based on the response.

4. The method of any of embodiments 1-3, wherein obtaining a plurality of character records, each character record including a trait vector specifying traits of the respective character comprises: receiving a human-scored trait vector for a plurality of characters in an item of media.

5. The method of any of embodiments 1-4, comprising: receiving a request to identify characters corresponding to two mash-up characters; calculating a synthetic trait vector by combining trait vectors of the two mash-up characters; and searching for character records having a trait vector similar to the synthetic trait vector.

6. The method of any of embodiments 1-5, comprising: sending the user a quiz to evaluate traits in the trait vectors; receiving a response to the quiz from the user; constructing a user trait vector based on the response.

7. The method of embodiment 6, comprising: searching for character records having a trait vector similar to the trait vector of a user.

8. The method of embodiment 6, comprising: searching for other user records having a trait vector similar to the trait vector of a user.

9. The method of any of embodiments 1-8, comprising: receiving a request to identify characters based on a binary list of traits; searching for character records having a trait vector similar to the binary list of traits.

10. The method of any of embodiments 1-9, comprising: recommending characters to the user based on a trait vector of the user.

11. A tangible, non-transitory, machine-readable medium storing instructions that when executed by a data processing apparatus cause the data processing apparatus to perform operations comprising: the steps of any of embodiments 1-10.

12. A system, comprising:
one or more processors; and
memory storing instructions that when executed by the processors cause the processors to effectuate operations comprising: the steps of any of embodiments 1-10.

What is claimed is:

1. A method comprising:
obtaining, with one or more processors, a plurality of character records of fictional characters appearing in media items, each character record including a trait vector specifying traits of the respective character;

receiving, with one or more processors, an indication from a user device that a user prefers a reference character among a set of characters in the media items, the reference character having a reference character record among the plurality of character records;

matching, with one or more processors, other characters in the character records to the reference character based on at least some of the character records by;
  calculating, with one or more processors, matching scores indicative of proximity in trail: vector space between the trait vector o the reference character record and trait vectors of other character records among the plurality of character records; and
  selecting, with one or more processors, responsive character records from among the plurality of character records based on the matching scores;

sending, with one or more processors, the user device a quiz to evaluate traits in the trait vectors;

receiving, with one or more processors, a response to the quiz from the user device;

constructing, with one or more processors, a user trait vector based on the response to the quiz;

matching, with one or more processors, another user to the user by calculating a matching score indicative of proximity in the trait vector space between the user trait vector and a trait vector of the other user based on a response of the other user to the quiz;

determining, with one or more processors, a recommendation for the other user that includes at least some of the other characters or a media item including at least some of the other characters based on both;
  a) the at least some of the other characters being matched based on proximity in the trait vector space to the reference character the user indicated as being preferred, and
  b) the user being matched based on proximity in the trait vector space to the other user; and causing, with one or more processors, the recommendation to be presented on another user computing device of the other user, wherein:

the trait vectors of the reference character, the other character records, the user, and the other user each have 26 dimensions or more, each dimension corresponding to one of the traits and having a value within a range, each of at least sonic dimensions having a value within the same range;

calculating the matching scores for respective pairs of trait vectors to match pairs of users or pairs of characters comprises:
  non-linearly transforming values of each of at least some dimensions of the respective pair to increase effects on matching scores of values at ends of the range relative to effects on matching scores of values not at ends of the range,
  determining differences between values of respective dimensions of the respective pair of trait vectors to form 26 differences or more, at least some of the differences being affected by the non-linearly transforming of values, determining a respective distance in the trait vector space based on the 26 differences or more, and
  determining a respective matching score based on the respective distance in trait vector space; and obtaining the plurality of character records comprises accessing a model trained on natural language text by:
obtaining text of media containing a given character, analyzing the text with natural language processing to score traits of the character by calculating n-gram counts of terms expressed by the given character; and
constructing a trait vector for the given character with the scored traits.

2. The method of claim 1, wherein obtaining a plurality of character records, each character record including a trait vector specifying traits of the respective character comprises:
sending a user a character comparison interface requesting the user the compare two characters according to a trait;
receiving a response indicating which of the two characters exhibits the trait more strongly; and
adjusting a trait score for each of the two characters based on the response.

3. The method of claim 1, wherein obtaining a plurality of character records, each character record including a trait vector specifying traits of the respective character comprises:
receiving a human-scored trait vector for a plurality of characters in an item of media.

4. The method of claim 1, comprising:
receiving a request to identify characters corresponding to two mash-up characters;
calculating a synthetic trait vector by combining trait vectors of the two mash-up characters; and
searching for character records having a trait vector determined to be similar to the synthetic trait vector.

5. The method of claim 1, wherein the respective distance in trait vector space is a Euclidian distance.

6. The method of claim 1, wherein the respective distance in trait vector space is based on a sum based on the differences.

7. The method of claim 1, wherein:
the response to the quiz is received from the user device before receiving the indication that the user prefers the reference character; and
the other characters are matched to the reference character and the user is matched to the other user before receiving a request for the recommendation from the other user.

8. The method of claim 1, comprising:
receiving a request to identify characters based on a binary list of traits;
searching for character records having a trait vector determined to be similar to the binary list of traits.

9. The method of claim 1, comprising:
clustering the plurality of characters into archetype clusters by determining a density based clustering of the trait vectors of the plurality of characters in the trait vector space.

10. A system, comprising:
one or more processors; and
memory storing instructions that when executed by at least some of the processors cause operations comprising:
obtaining a plurality of character records of fictional characters appearing in media items, each character record including a trait vector specifying traits of the respective character;
receiving an indication from a user device that a user prefers a reference character among a set of characters in the media items, the reference character having a reference character record among the plurality of character records;
matching other characters in the character records to the reference character based on at least some of the character records by:
calculating, with one or more processors, matching scores indicative of proximity in trait vector space between the trait vector of the reference character record and trait vectors of other character records among the plurality of character records; and
selecting responsive character records from among the plurality of character records based on the matching scores;
sending, with one or more processors, the user device a quiz to evaluate traits in the trait vectors;
receiving, with one or more processors, a response to the quiz from the user device;
constructing, with one or more processors, a user trait vector based on the response to the quiz;
matching, with one or more processors, another user to the user by calculating a matching score indicative of proximity in the trait vector space between the user trait vector and a trait vector of the other user based on a response of the other user to the quiz;
determining, with one or more processors, a recommendation for the other user that includes at least some of the other characters or a media item including at least some of the other characters based on both:
a) the at least some of the other characters being matched based on proximity in the trait vector space to the reference character the user indicated as being preferred, and
b) the user being matched based on proximity in the trait vector space to the other user; and
causing, with one or more processors, the recommendation to be presented on another user computing device of the other user, wherein:
the trait vectors of the reference character, the other character records, the user, and the other user each have 5 dimensions or more, each dimension corresponding to one of the traits; and
calculating the matching scores for respective pairs of trait vectors to match pairs of users or pairs of characters comprises:
non-linearly transforming values of each of at least some dimensions of the respective pair to increase effects on matching scores of values at ends of a range relative to effects on matching scores of values not at ends of the range,
determining differences between values of respective dimensions of the respective pair of trait vectors to form 5 differences or more, at least some of the differences being affected by the non-linearly transforming of values,
determining a respective distance in the trait vector space based on the 5 differences or more, and determining a respective matching score based on the respective distance in trait vector space; and
obtaining the plurality of character records comprises accessing a model trained on natural language text by:
obtaining text of media containing a given character;
analyzing the text with natural language processing to score traits of the character by calculating n-gram counts of terms expressed by the given character; and
constructing a trait vector for the given character with the scored traits.

11. The system of claim 10, wherein obtaining a plurality of character records, each character record including a trait vector specifying traits of the respective character comprises:
   sending a user a character comparison interface requesting the user the compare two characters according to a trait;
   receiving a response indicating which of the two characters exhibits the trait more strongly; and
   adjusting a trait score for each of the two characters based on the response.

12. The system of claim 10, wherein obtaining a plurality of character records, each character record including a trait vector specifying traits of the respective character comprises:
   receiving a human-scored trait vector for a plurality of characters in an item of media.

13. The system of claim 10, wherein the operations comprise:
   receiving a request to identify characters corresponding to two mash-up characters;
   calculating a synthetic trait vector by combining trait vectors of the two mash-up characters; and
   searching for character records having a trait vector determined to be similar to the synthetic trait vector.

14. The system of claim 10, wherein the respective distance in trait vector space is a Euclidian distance.

15. The system of claim 10, wherein the respective distance in trait vector space is based on a sum based on the differences.

16. The system of claim 10, wherein the operations comprise:
   steps for comparing trait vectors.

17. The system of claim 10, wherein the operations comprise:
   receiving a request to identify characters based on a binary list of traits;
   searching for character records having a trait vector determined to be similar to the binary list of traits.

18. The system of claim 10, wherein the operations comprise:
   clustering the plurality of characters into archetype clusters by determining a density based clustering of the trait vectors of the plurality of characters in the trait vector space.

19. A tangible, non-transitory, machine readable medium storing instructions that when executed by one or more processors effectuate operations comprising:
   obtaining, with one or more processors, personality quiz results from a plurality of users;
   forming, with one or more processors, trait vectors for each of the users based on the quiz results, each trait vector having five or more dimension each corresponding to a different trait of the corresponding user, the trait vectors being defined in a trait vector space;
   obtaining, with one or more processors, for each of the users, data indicating affinity of the users to content or characters in content;
   selecting, with one or more processors, content or characters in content for a given one of the users by determining that the given one of the users has a given trait vector that is determined to be similar to trait vectors of other users indicated by the obtained data to have an affinity to the selected content or characters in content, wherein determining that the given one of the users has a given trait vector that is determined to be similar to trait vectors of other users indicated by the obtained data to have an affinity to the selected content or characters in content comprises calculating matching scores for respective pairs of trait vectors to match pairs of users by:
      non-linearly transforming values of each of at least some dimensions of the respective pair to increase effects on matching scores of values at ends of a range relative to effects on matching scores of values not at ends of the range,
      determining differences between values of respective dimensions of the respective pair of trait vectors to form five differences or more, at least some of the differences being affected by the non-linearly transforming of values,
      determining a respective distance in the trait vector space based on the five differences or more, and
      determining a respective matching score based on the respective distance in trait vector space;
   causing, with one or more processors, the selected content or characters in content to be recommended to the given one of the users;
   training a user-classification model by clustering the users into groups having psycho-demographic characteristics by determining a density based clustering of the trait vectors of the users in the trait vector space; and
   selecting additional content to be provided to the given one of the users based on the given trait vector and the trained user-classification model.

* * * * *